United States Patent
Hazen et al.

(10) Patent No.: US 10,425,295 B1
(45) Date of Patent: Sep. 24, 2019

(54) TRANSFORMATION PLATFORM

(71) Applicant: Accenture Global Solutions Limited, Dublin (IE)

(72) Inventors: Phillip E. Hazen, Houston, TX (US); Anil Vohra, Chinsurah-Magra (IN); Deepa Yendigeri, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/284,643

(22) Filed: Feb. 25, 2019

(30) Foreign Application Priority Data

Mar. 8, 2018 (IN) .............................. 201841008558

(51) Int. Cl.
*H04L 12/24* (2006.01)
*G06Q 10/06* (2012.01)
*G06N 20/00* (2019.01)

(52) U.S. Cl.
CPC ......... *H04L 41/5048* (2013.01); *G06N 20/00* (2019.01); *G06Q 10/0631* (2013.01); *H04L 41/0843* (2013.01); *H04L 41/0893* (2013.01); *H04L 41/5009* (2013.01); *H04L 41/5022* (2013.01); *H04L 41/5096* (2013.01)

(58) Field of Classification Search
CPC ............. H04L 41/5048; H04L 41/0843; H04L 41/0893; H04L 41/5009; H04L 41/5022; H04L 41/5096; G06N 20/22; G06Q 10/0631
See application file for complete search history.

(56) References Cited

U.S. PATENT DOCUMENTS

| | | | | |
|---|---|---|---|---|
| 9,134,961 | B1* | 9/2015 | Cohen | G06F 8/30 |
| 9,172,738 | B1* | 10/2015 | daCosta | H04L 67/00 |
| 9,665,628 | B1* | 5/2017 | Dubey | G06F 16/215 |
| 2004/0162781 | A1* | 8/2004 | Searl | G06F 11/0709 |
| | | | | 705/51 |
| 2005/0010598 | A1* | 1/2005 | Shankar | G06Q 10/06 |
| 2006/0206442 | A1* | 9/2006 | Hartman | G06F 9/4488 |
| | | | | 706/20 |

(Continued)

OTHER PUBLICATIONS

Extended European Search Report for Application No. EP19161175.5, dated Apr. 18, 2019, 69 pages.

*Primary Examiner* — Blake J Rubin
(74) *Attorney, Agent, or Firm* — Harrity & Harrity, LLP

(57) ABSTRACT

A device may receive a request for a service management plan that is to be used to implement a fully-integrated enterprise resource planning (ERP) system for an organization. The device may receive organizational data associated with the organization. The device may determine, based on the organizational data, observations that serve as hypotheses for deficiencies associated with a current state of a system of the organization. The device may identify, based on the observations, priorities that define a target state for the fully-integrated ERP system that is to be generated. The device may select, based on a machine-learning-driven analysis of the observations and the priorities, a recommendation for a configuration of the fully-integrated ERP system. The device may generate, based on the recommendation, the service management plan for the organization. The device may perform a set of actions to cause the configuration to be implemented.

20 Claims, 12 Drawing Sheets

(56) References Cited

U.S. PATENT DOCUMENTS

| | | | |
|---|---|---|---|
| 2007/0101331 A1* | 5/2007 | Krebs | G06F 9/453 718/101 |
| 2007/0157195 A1 | 7/2007 | Gaa-Frost et al. | |
| 2008/0249825 A1 | 10/2008 | Kunjur et al. | |
| 2008/0313110 A1* | 12/2008 | Kreamer | G06Q 10/06 706/12 |
| 2009/0259455 A1* | 10/2009 | Becker | G06Q 10/06 703/22 |
| 2010/0037237 A1* | 2/2010 | Reinart | G06F 9/541 719/313 |
| 2010/0179930 A1* | 7/2010 | Teller | G06N 20/00 706/12 |
| 2012/0095956 A1* | 4/2012 | Xiong | G06Q 10/067 707/600 |
| 2012/0221486 A1* | 8/2012 | Leidner | G06Q 10/0635 705/36 R |
| 2013/0144945 A1* | 6/2013 | Said | G06Q 30/00 709/204 |
| 2013/0318061 A1* | 11/2013 | Said | G06F 16/2343 707/705 |
| 2014/0214801 A1* | 7/2014 | Ciliberti, III | G06Q 10/0631 707/722 |
| 2015/0032432 A1* | 1/2015 | Cleasby | G06F 17/5086 703/7 |
| 2016/0042321 A1* | 2/2016 | Held | G06Q 10/08355 705/338 |
| 2017/0235466 A1* | 8/2017 | Tanwir | G06Q 10/067 715/738 |
| 2017/0235735 A1* | 8/2017 | Ignatyev | G06F 16/24578 706/12 |
| 2017/0236060 A1* | 8/2017 | Ignatyev | G06F 16/2365 706/46 |
| 2017/0236081 A1* | 8/2017 | Grady Smith | G06Q 10/0637 705/7.36 |
| 2017/0286880 A1* | 10/2017 | Wiig | G06Q 10/067 |
| 2017/0310691 A1* | 10/2017 | Vasseur | H04L 63/1425 |
| 2017/0318083 A1* | 11/2017 | Ignatyev | H04L 67/306 |
| 2018/0060780 A1 | 3/2018 | Kilmartin et al. | |
| 2018/0197128 A1* | 7/2018 | Carstens | G06Q 10/0635 |
| 2018/0315141 A1* | 11/2018 | Hunn | G06F 16/93 |
| 2018/0329935 A1* | 11/2018 | Mugali | G06F 16/25 |
| 2019/0018399 A1* | 1/2019 | Shah | G06N 20/00 |
| 2019/0042988 A1* | 2/2019 | Brown | G06N 20/00 |
| 2019/0080399 A1* | 3/2019 | Jain | G06N 20/00 |
| 2019/0095320 A1* | 3/2019 | Biswas | G06F 11/3688 |

\* cited by examiner

TRANSFORMATION PLATFORM

RELATED APPLICATION

This application claims priority under 35 U.S.C. § 119 to Indian Patent Application No. 201841008558, filed on Mar. 8, 2018, the content of which is incorporated by reference herein in its entirety.

BACKGROUND

An organization may plan resource usage and/or allocation using a system, such as an enterprise resource planning (ERP) system. The ERP system may manage the end-to-end process of the organization by utilizing hardware equipment and a set of ERP software tools.

SUMMARY

According to some implementations, a method may include receiving a request for a service management plan that is to be used to implement a fully-integrated enterprise resource planning (ERP) system for an organization. The method may receive organizational data associated with the organization. The method may, by performing one or more diagnostic assessments of the organizational data, a set of observations that include observations describing deficiencies associated with a current state of a system of the organization. The method may identify, based on the set of observations, a set of priorities that define a target state for the fully-integrated ERP system that is to be generated. The method may select, based on a machine-learning-driven analysis of the set of observations and the set of priorities, a recommendation for a configuration of the fully-integrated ERP system, wherein the configuration identifies: a set of service management tools that are to be used within an environment of the fully-integrated ERP system, and a data fabric aggregation tool that allows the set of service management tools to access shared application data. The method may generate, based on the recommendation, the service management plan for the organization, wherein the service management plan describes a manner in which to implement the configuration of the fully-integrated ERP system. The method may perform a set of actions to cause the configuration to be implemented, wherein implementing the configuration allows the set of service management tools to support end-to-end processes of the organization.

According to some implementations, a device may include one or more memories, and one or more processors, operatively coupled to the one or more memories, to: receive a request for a service management plan that is to be used to implement a fully-integrated enterprise resource planning (ERP) system for an organization. The one or more processors may receive organizational data associated with the organization. The one or more processors may determine, based on the organizational data, a set of observations that include observations describing deficiencies associated with associated with a current state of a system of the organization. The one or more processors may identify, based on the set of observations, a set of priorities that define a target state for the fully-integrated ERP system that is to be generated. The one or more processors may generate, based on a machine-learning-driven analysis of the set of observations and the set of priorities, a recommendation for a configuration of the fully-integrated ERP system, wherein the configuration identifies at least one of: a set of service management tools that are to be used within an environment of the fully-integrated ERP system, or a data fabric aggregation tool that allows the set of service management tools to access shared application data. The one or more processors may generate, based on the recommendation, the service management plan for the organization, wherein the service management plan includes: a first set of instructions that describe a manner in which to implement the configuration of the fully-integrated ERP system, and a second set of instructions that describe a manner in which to measure performance of the fully-integrated ERP system relative to the system of the organization. The one or more processors may perform a first set of actions to cause the configuration to be implemented, wherein implementing the configuration allows the set of service management tools to support end-to-end processes of the organization. The one or more processors may perform a second set of actions to cause performance statistics to be displayed via an interface, wherein the performance statistics measure the performance of the fully-integrated ERP system relative to the system of the organization.

According to some implementations, a non-transitory computer-readable medium may store one or more instructions. The one or more instructions, when executed by one or more processors of a device, may cause the one or more processors to: receive a request for a service management plan that is to be used to implement a fully-integrated enterprise resource planning (ERP) system for an organization. The one or more instructions may cause the one or more processors to receive organizational data associated with the organization. The one or more instructions may cause the one or more processors to determine, based on the organizational data, a set of observations that include observations describing deficiencies associated with a current state of a system of the organization. The one or more instructions may cause the one or more processors to identify, based on the set of observations, a set of priorities that define a target state for the fully-integrated ERP system that is to be generated. The one or more instructions may cause the one or more processors to determine, using a machine-learning-driven analysis of the set of observations and the set of priorities, a set of scores for a set of recommendations for configurations of the fully-integrated ERP system, wherein the set of scores indicate likelihoods of particular configurations, of the configurations, causing a state of the fully-integrated ERP system to be the target state. The one or more instructions may cause the one or more processors to select a recommendation, of the set of recommendations, for a configuration, of the configurations of the fully-integrated ERP system, based on the set of scores, wherein the configuration identifies at least one of: an environment used to support the fully-integrated ERP system, a set of service management tools that are to be used within the environment of the fully-integrated ERP system, or a data fabric aggregation tool that allows the set of service management tools to access shared application data. The one or more instructions may cause the one or more processors to generate, based on the recommendation, the service management plan for the organization, wherein the service management plan includes a timeline that indicates when to implement one or more aspects of the configuration for the fully-integrated ERP system. The one or more instructions may cause the one or more processors to perform a set of actions over time to cause the configuration to be implemented, wherein implementing the configuration allows the set of service management tools to support end-to-end processes of the organization.

DETAILED DESCRIPTION

Figure 1A:
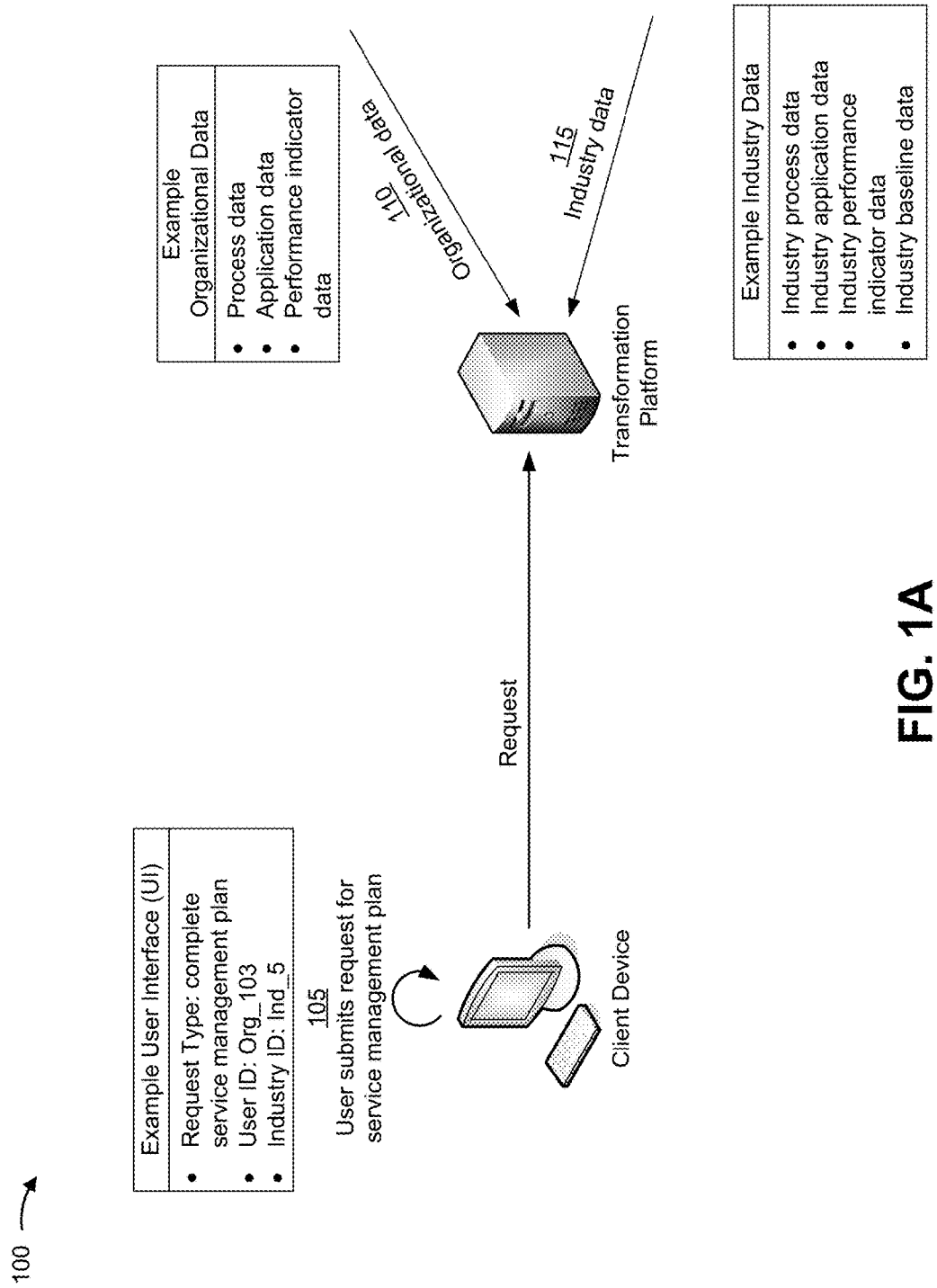
FIGS. 1A-1F are diagrams of one or more example implementations described herein.

The following detailed description of example implementations refers to the accompanying drawings. The same reference numbers in different drawings may identify the same or similar elements.

Enterprise resource planning (ERP) is the integrated management of end-to-end processes of an organization. An ERP system may include ERP tools, such as project management tools, information technology (IT) management tools, supply chain management tools, human resources management tools, customer service management tools, and/or the like.

An organization may utilize ERP tools by deploying the ERP tools within an ERP environment. The ERP environment may be supported by one or more virtual machines and devices of the organization may access the ERP tools via a web interface. When selecting the ERP tools for the ERP environment, the organization may select project management tools offered by a first seller organization, IT management tools offered by a second seller organization, human resources management tools offered by a third seller organization, customer service management tools offered by a fourth seller organization, and/or the like. Over time, the organization may bring in new ERP tools and/or may upgrade existing ERP within the ERP system.

However, deploying ERP tools in this manner causes a litany of problems within the ERP system. For example, by deploying different ERP tools from different seller organizations, the ERP system will support duplicative services, which wastes resources (e.g., processing resources, network resources, memory resources, and/or the like) by to creating situations where duplicative data is generated, processed, transmitted via a network, and/or the like. Furthermore, deploying different ERP tools from different seller organizations may cause compatibility issues, thereby wasting resources when ERP tools crash due to compatibility issues, wasting resources by inefficiently handling data due to compatibility issues, and/or the like. Additionally, using different ERP tools from different seller organizations reduces employee's ability to effectively utilize the ERP tools because each seller organization may offer ERP tools that have different ways of offering particular services, may use different interface displays, and/or the like. This wastes resources when employees inefficiently use ERP tools, incorrectly use ERP tools, and/or the like.

Some implementations described herein provide a transformation platform to generate and implement a service management plan that is able to manage a fully-integrated ERP system for an organization. For example, the transformation platform may generate and implement a service management plan that includes a first phase for offering the organization a configuration of the fully-integrated ERP system, a second phase for implementing the configuration, a third phase for assisting the organization in effectively utilizing the fully-integrated ERP system, and a fourth phase for measuring performance of the fully-integrated ERP system relative to a prior system used by the organization (and/or one or more benchmarked systems).

In this way, the transformation platform is able to generate and implement the service management plan in a manner that ensures efficient and effective utilization of resources of the fully-integrated ERP system. For example, by configuring a data fabric tool in a manner that allows the set of service management tools to access shared application data, the transformation platform improves synergy between service management tools, thereby reducing or eliminating resources (e.g., processing resources, network resources, memory resources, and/or the like) that would otherwise be wasted in situations where duplicative data is generated by service management tools, resources that would otherwise be wasted when service management tools experienced compatibility issues when interacting with each other, resources that would otherwise be wasted executing error correction procedures after service management tools were unable to properly or efficiently interact with each other, and/or the like. Furthermore, by assisting the organization in utilizing the set of service management tools after deployment, the transformation platform conserves resources that would otherwise be wasted when devices of the organization were used to inefficiently utilize service management tools, incorrectly use service management tools, and/or the like.

FIGS. 1A-1F are diagrams of one or more example implementations 100 described herein. For example, the one or more example implementations 100 may include a client device, a transformation platform, and a fully-integrated enterprise resource planning (ERP) system. As shown in FIGS. 1A-1F, the transformation platform may generate and implement a service management plan to allow an organization to utilize a set of service management tools that are supported by the fully-integrated ERP system.

As shown in FIG. 1A, and by reference number 105, a user may submit a request for the service management plan. For example, a user may use the client device to interact with an interface of an application or a website that allows the user to input a request for the service management plan. In this case, the user may input login credentials to access the interface and may input the request. When the user submits the request, the request may be provided to the transformation platform.

The request may include information that may be input by the user and information that may be automatically populated based on the user that provided the request. For example, the user may input a type of service management plan, one or more user-defined priorities that may be used to when creating the transformation platform, and/or the like. As another example, if the user works for an organization and logs in using an organization-provided account, the request may include information that may be automatically populated, such as an industry identifier that identifies an industry in which an organization associated with the user operates, one or more configured user preferences, and/or the like.

The type of service management plan may be a complete service management plan or a partial service management plan. The complete service management plan may include a first phase for offering the organization a configuration of the fully-integrated ERP system, a second phase for implementing the configuration, a third phase for assisting the organization in effectively utilizing the fully-integrated ERP system, and a fourth phase for measuring performance of the fully-integrated ERP system relative to a prior system used by the organization (and/or one or more benchmarked systems). Additionally, or alternatively, the complete service management plan may include one or more phases for recommending and implementing ways to improve one or more processes of the organization, as will be described further herein. The partial service management plan may include one or more of the phases of the plan. The one or more user-defined priorities may specify one or more performance indicators that the user is hoping to improve by implementing the service management plan, as further defined elsewhere herein.

In some implementations, the user may submit a request for a service management plan for a fully-integrated ERP system that is to replace a system being presently used by the organization. For example, the user may be an employee of an organization that is using a Systems Applications and Products (SAP) ERP system or a similar type of ERP system and may be requesting a service management plan to replace the SAP ERP system with a fully-integrated ERP system (e.g., which may be a fully-integrated SAP ERP system). In some implementations, the user may request a service management plan for a fully-integrated ERP system that is to interact with the current ERP system of the organization.

As shown by reference number 110, the transformation platform may receive organizational data for the organization. For example, the transformation platform may, based on receiving the request, receive organizational data that may be used to generate the service management plan. The organization data may include process data that describes a set of organizational processes that are used for providing goods and/or services to customers, application data that is generated while the organizational processes are being performed, performance indicator data that identifies a set of network performance metrics that the organization has generated for measuring performance within the organization, and/or the like.

The process data may include data that describes a set of processes within the organization. For example, the organization may be divided by a group of departments and each department may have a set of processes to perform particular tasks. As a specific example, process data may describe a product order and delivery process. In this example, the process data may indicate that a customer requests to purchase a product, that a credit check of the customer is performed, that a price quote is made, that an offer is made, that the offer is accepted, and that the product is delivered to the customer. It is to be understood that this provided by way of example, and that in practice, the process data will describe processes for all (or some) processes used within the organization.

The application data may include order management and inventory data, transportation management data, procurement data, asset lifecycle management data, supply chain management data, supplier management data, project and portfolio management data, customer relationship management data, and/or the like. To provide a particular example, the order management and inventory data may include data identifying particular customer orders, inventory data identifying current inventory for a particular store or warehouse, tracking data identifying a current geographic location of a product, and/or the like.

As another example, the transportation management data may include the tracking data that identifies the current geographic location of the product, vehicle data identifying delivery schedules and/or delivery routes, packaging data (e.g., identifying how products are packaged, how much time is spent packaging the products, packaging analytics data, etc.), and/or the like. As another example, the procurement data may include contractual data relating to agreements between the organization and client organizations for particular goods and/or services, such as a final contract between the organization and a client organization, records of negotiations between the organization and the client organization, non-disclosure agreements, and/or the like.

As another example, the asset lifecycle management data may include data identifying a tangible asset (e.g., a property, a product, a vehicle, etc.), data identifying an intangible asset (e.g., intellectual property, human capital, a financial asset, etc.), and/or the like. As another example, the supply chain management data may include data identifying raw materials used to create a product, data identifying work-in-process inventory, data identifying finished products, data tracking the raw materials, the work-in-process inventory, and/or the finished products, and/or the like.

It is to be understood that the application data is also provided by way of example. In practice, any number of different types of application data may be provided to the transformation platform. For example, application data may be provided that relates to sales, production, accounting, human resources, corporate performance and governance, and/or the like.

The performance indicator data may include data that identifies a set of system performance indicators, data that identifies a set of sales-related performance indicators, data that identifies a set of process performance indicators. The set of system performance indicators may include a performance indicator that measures a utilization rate for a particular resource of a tool used within the current ERP system (e.g., as is used by an employee, a store, a department, the organization, etc.), a utilization rate for the tool within the current ERP system (e.g., as is used by the employee, by the store, the department, the organization, and/or the like). As a specific example, the current ERP system of the organization may have a workflow management tool that is available to employees across one or more departments within the organization. In this example, a system performance indicator might track a utilization rate to provide the organization with an indication of which departments are utilizing the workflow management tool, which departments are effectively utilizing the workflow management tool, and/or the like.

The data that identifies the set of sales-related performance indicators may include a performance indicator that indicates an amount of product sales made over time (e.g., for an employee, for a store, for a department, for the organization, and/or the like), a performance indicator that indicates an amount of expenses incurred over time (e.g., for the employee, for the department, for the organization, etc.), and/or the like.

The set of process performance indicators may include performance indicators for processes associated with the organizational groups described above (e.g., order management and inventory, transportation management, procurement, supply chain management, and/or the like). For example, the set of process performance indicators may include a performance indicator that indicates an average stock release time, a performance indicator that indicates whether the organization has hit particular product targets over time, a performance indicator that indicates an amount of unplanned downtime over an interval (e.g., where a worker is unable to perform a task due), a performance indicator that indicates sales across one or more departments of the organization, a performance indicator that indicates worker productivity over an interval, and/or the like.

It is to be understood that these are provided by way of example. In practice, the transformation platform may receive performance indicator data that identifies hundreds of performance indicators, thousands of performance indicators, or more.

In some implementations, the transformation platform may obtain organizational data from a data storage device. For example, a data storage device may store organizational data for the organization, and the transformation platform may, based on receiving the request, have permission to perform a search query to obtain the organizational data from the data storage device.

Additionally, or alternatively, the transformation platform may be provided with organizational data as part of the request. For example, the user may upload one or more files that include organizational data, and the one or more files may be provided to the transformation platform as part of the request. Additionally, or alternatively, the transformation platform may generate organizational data. For example, the transformation platform may be provided with the application data and may analyze the application data to generate the performance indicator data.

As shown by reference number 115, the transformation platform may receive industry data for an industry in which the organization operates. For example, the transformation platform may reference information included in the request to identify a type of industry in which the organization operates and may reference a data storage device to obtain industry data for the industry.

The industry data may include organizational data for other organizations within the industry, industry performance indicator data for the other organizations within the industry, industry baseline data that indicates one or more averages or universally agreed upon norms for particular performance indicators within the industry, and/or the like.

In this way, the transformation platform receives organizational data and industry data that may be used generate a service management plan for the organization.

Figure 1B:
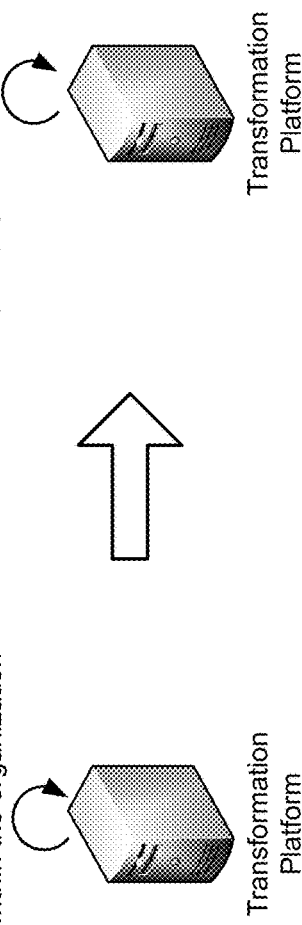

As shown in FIG. 1B, and by reference number 120, the transformation platform may generate a set of observations associated with a state of a current ERP system of the organization and/or a state of processes used within the organization. For example, the transformation platform may perform one or more diagnostic assessments (e.g., a diagnostic system assessment, a diagnostic process assessment, and/or the like) on the organizational data to generate observations relating to a state of the current ERP system, observations relating to a state of a process used by the organization, and/or the like. An observation may, in some cases, be a value that specifies a quantifiable metric relating to performance of the current ERP system, performance of a process used within the organization, and/or the like. Additionally, or alternatively, an observation may specify a deficiency (e.g., based on comparing a quantifiable metric to a baseline or industry standard, etc.) of the current ERP system, a deficiency of a process used within the organization, and/or the like. Several examples are provided below.

In some implementations, the transformation platform may perform a diagnostic system assessment on the current ERP system. For example, the transformation platform may perform, as a first part of the diagnostic system assessment, a code assessment to generate one or more observations relating to an amount of customization used within tools that are part of the current ERP system of the organization, to generate one or more observations relating to an amount of automation used by tools that are part of the current ERP system of the organization, and/or the like.

As an example, the transformation platform may perform the code assessment to analyze lines of source code used to support the ERP tools within the current ERP system to identify the amount of customization used within the ERP tools of the current ERP system. In this example, if the current ERP system is an SAP ERP system, and the transformation platform has access to source code for a default configuration of the SAP ERP system, then the transformation platform may identify the amount of customization by comparing current source code for the ERP tools within the SAP ERP system to source code that is part of the default configuration of the SAP ERP system. In other cases, rather than measure customization by percentage of customized code, the transformation platform may use another metric, such as by identifying a set of functions or features and determining a percentage of the set of functions or features that have been customized.

Continuing with the example, the transformation platform may compare the identified amount of customization and one or more customization benchmarks (e.g., for the industry, for a competitor, etc.), and may, if the identified amount of customization is a threshold degree lower than the one or more customization benchmarks, generate an observation that the current ERP system of the organization is supporting tools that have low amounts of customization relative to the one or more customization benchmarks.

As another example, the transformation platform may perform the code assessment to identify the amount of automation being used within the current ERP system. In this example, the transformation platform may be configured with a set of rules that may be used to assess whether a particular ERP tool is an automation tool, whether a feature of the particular ERP tool is an automation service, and/or the like. Additionally, the service management plan may apply the set of rules to the ERP tools within the current ERP system of the organization to identify the amount of automation being used within the current ERP system. As a specific example, a rule may be applied to an ERP tool to determine that an output of the ERP tool is to provide data for display via an interface, such that a human user may manually view and act upon the data being displayed. This may cause the service management plan to mark the ERP tool (or a feature of the ERP tool) as an ERP tool or a feature that has yet to be automated.

Continuing with the example, the transformation platform may compare the identified amount of automation and one or more automation benchmarks (e.g., for the industry, for a competitor, etc.) and may, if the identified amount of automation is substantially lower than the one or more automation benchmarks, generate an observation that the current ERP system is supporting tools that have low automation relative to the one or more automation benchmarks.

Additionally, or alternatively, the transformation platform may perform, as a second part of the diagnostic system assessment, a capabilities assessment to generate one or more observations that identify a set of capabilities of the current ERP system of the organization. For example, the transformation platform may analyze the organizational data and/or metadata associated with the ERP tools of the current ERP system to identify a set of deficiencies within the current ERP system.

As an example, the transformation platform may perform the capabilities assessment and may determine that a cumbersome user interface in a planning tool may limit a capability to perform detailed analysis with optimal visualizations. As another example, the transformation platform may perform the capabilities assessment and may determine that lack of integration between a demand planning tool and a supply planning tool are causing increases in latency and delays in coming out with solutions to organizational problems. It is to be understood that these are provided by way of example, and that in practice, any number of different types of capability assessments may be performed any number of different determinations regarding capabilities and/or deficiencies may be made.

Additionally, or alternatively, the transformation platform may perform a diagnostic process assessment on the set of organizational processes of the organization. For example, the transformation platform may analyze the process data of the organization to generate one or more observations that identify candidate for process improvement. As a specific example, if the organization is a retailer and has an online website for selling merchandise, the transformation platform may analyze a purchase-to-sale process that a customer would need to perform to purchase a product and may determine that the organization has a category for women's shoes and a category for men's shoes. Additionally, the transformation platform may determine that a norm in the industry is to have three unique shoe categories (e.g., women's shoes, men's shoes, and children's shoes) and may identify the fact that the retailer does not have a category for children's shoes as a candidate for process improvement.

As shown by reference number 125, the transformation platform may identify a set of priorities that define a target state for the fully-integrated ERP system that is to be generated. For example, the transformation platform may identify the set of priorities based on the set of observations, based on priorities data provided by the organization, and/or the like. The set of priorities may include a priority indicating a desired amount of customization to have within service management tools of the fully-integrated ERP system that is to be generated, a priority indicating a desired amount of automation to have provided by the service management tools of the fully-integrated ERP system, a priority for supporting one or more capabilities with the fully-integrated ERP system, a priority indicating to improve a process of the organization, and/or the like.

In some implementations, the transformation platform may identify one or more priorities based on the set of observations. For example, observation data for an observation may indicate that tools of the current ERP system of the organization have 20% customization and that systems used by competitor organizations in the same industry have on average of 40% customization. Because higher customization correlates with higher utilization rates of tools and more efficient utilization of systems as a whole, the transformation platform may identify, as a priority, that a set of service management tools of the fully-integrated ERP system should have at least 40% customization.

Additionally, or alternatively, the transformation platform may identify one or more priorities based on priorities data provided by the organization. For example, the organization may already be aware of one or more deficiencies of the current ERP system. In this case, the user may provide, as part of the request, priorities data that identifies one or more priorities of the organization.

In this way, the transformation platform is able to generate a set of observations that define a state of the current ERP system of the organization and is able to identify a set of priorities that define a target state for the fully-integrated ERP system that is to be generated.

Figure 1C:
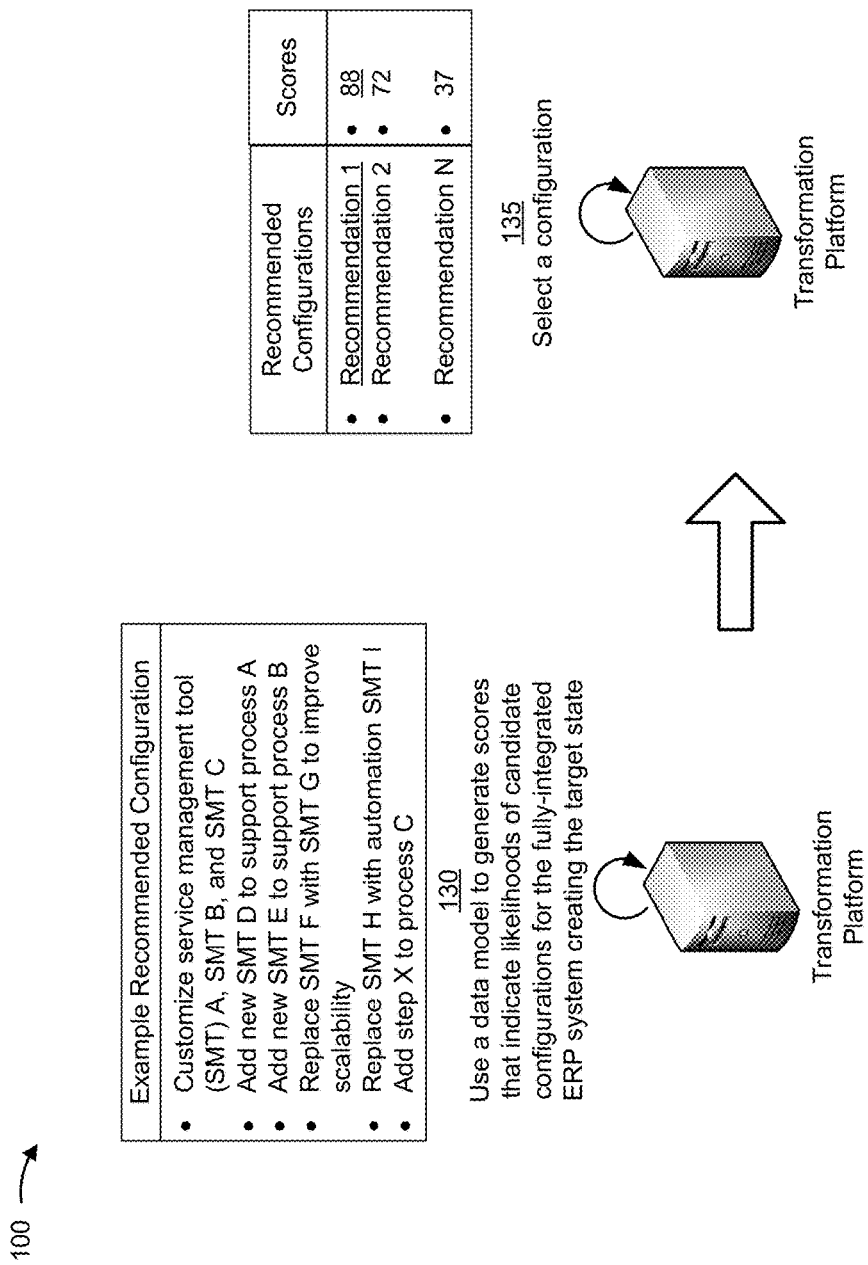

As shown in FIG. 1C, and by reference number 130, the transformation platform may use a data model to generate a set of scores that indicate likelihoods of a set of candidate configurations for the fully-integrated ERP system creating the target state. For example, the transformation platform may have trained a data model (or may be received a trained data model) to score configurations and may use the data model to generate, for each candidate configuration of the set of candidate configurations, a score that indicates a likelihood of causing a state of the fully-integrated ERP system to be the target state, as further described below.

In some implementations, the transformation platform may have trained the data model. For example, the transformation platform may receive training data such as historical organizational data of one or more other organizations, historical industry data, historical observations, historical priorities, historical results data that associated particular target states with particular configurations, and/or the like. In this case, the transformation platform may have trained a data model by analyzing the training data using one or more machine learning techniques, such as a regression technique, a classification technique, a technique using a neural network, and/or the like.

When training the data model, the transformation platform may have identified trends and/or patterns associated with particular combinations of training data. For example, the transformation platform may have identified a trend that organizations with efficient systems tend to have customization levels and/or automation levels that increase over time. As another example, the transformation platform may have identified a trend that upgrading a system with a high customization level requires more extensive upgrade procedures than systems with low customization levels. As another example, the transformation platform may have identified a trend that systems that use different tools from different seller organizations are more likely to encounter compatibility issues and/or synergy issues.

A candidate configuration for a fully-integrated ERP system may include a set of service management tools that are supported within an ERP environment, a data fabric aggregation tool that allows the set of service management tools to access shared application data, and/or the like. The set of service management tools may include tools used to perform services within particular organizational groupings. For example, the set of service management tools may include tools used to provide services relating to order management and inventor, transportation management, procurement, asset lifecycle management, supply chain management, supplier management, project and portfolio management, customer relationship management, and/or the like. In other cases, service management tools may be specific to a site or store within an organization, specific to a team of individuals, and/or the like. The environment, in some cases, may be an SAP ERP environment, such as an S4 environment, an S4 HANA environment, and/or a similar type of environment. The data fabric aggregation tool may allow the set of service management tools to access shared application data by converting shared application to a uniform format and providing the shared application data to be stored in the uniform format.

In some implementations, the transformation platform may support a master ERP environment that is able to interact with the ERP environment of the fully-integrated ERP system. The master environment may include a master repository of service management tools, a master data fabric aggregation tool, and/or the like. The master repository of service management tools may include service management tools that are being used as part of different configurations of fully-integrated ERP systems that are actively being utilized by other organizations. The master data fabric aggregation tool may interact with different data fabric aggregation tools of other the fully-integrated ERP systems of the other organizations. For example, as a service management tool provides application data to a data fabric aggregation tool that is part of a fully-integrated ERP system of a particular organization, the data fabric aggregation tool may convert the application data to shared application data and may provide the shared application data to the master data fabric aggregation tool.

The set of candidate configurations that are used by the data model may include different service management tools, differentiation variations of the same service management tool (e.g., with different features or service offerings, varied levels of customization, and/or the like), different environments, and/or the like.

In some implementations, the transformation platform may use the data model to determine the set of scores. For example, the transformation platform may provide, as input data to the data model, the organizational data, the industry data, the observation data for the set of observations, the priorities data for the set of priorities, and/or the like. This may cause the data model to process the input data and to generate a set of scores that indicate the likelihoods of the set of candidate configurations creating the target state.

As shown by reference number 135, the transformation platform may select a recommendation for a configuration. For example, the transformation platform may select a recommendation for a configuration, from the set of candidate configurations, based on the set of scores. In this case, the transformation platform may select, as the recommendation, the configuration that is associated with a best-available score of the set of scores (e.g., a score with a highest likelihood value, etc.).

In some implementations, the data model may be used to generate a score for each aspect of a configuration. For example, the transformation platform may use the data model to generate a score for each available service management tool, for each available environment, and/or the like. In this case, the transformation platform may select, as part of the recommendation, particular service management tools and/or one or more environments that are associated with scores that satisfy a threshold confidence level.

Additionally, or alternatively (not shown), the transformation platform may generate a set of scores that indicate likelihoods of a set of candidate process changes causing a state of the organization to be the target state. For example, the transformation platform may use the data model described above (or a separate trained data model) to analyze input data (defined above) and to generate a set of scores that indicate likelihoods of a set of candidate process changes causing the state of the organization to be the target state. In this case, the transformation platform may select one or more process changes, of the set of candidate process changes, based on the set of candidate process changes having scores that satisfy a threshold confidence level.

In this way, the transformation platform is able to select a configuration for the fully-integrated ERP system that is to be generated.

Figure 1D:
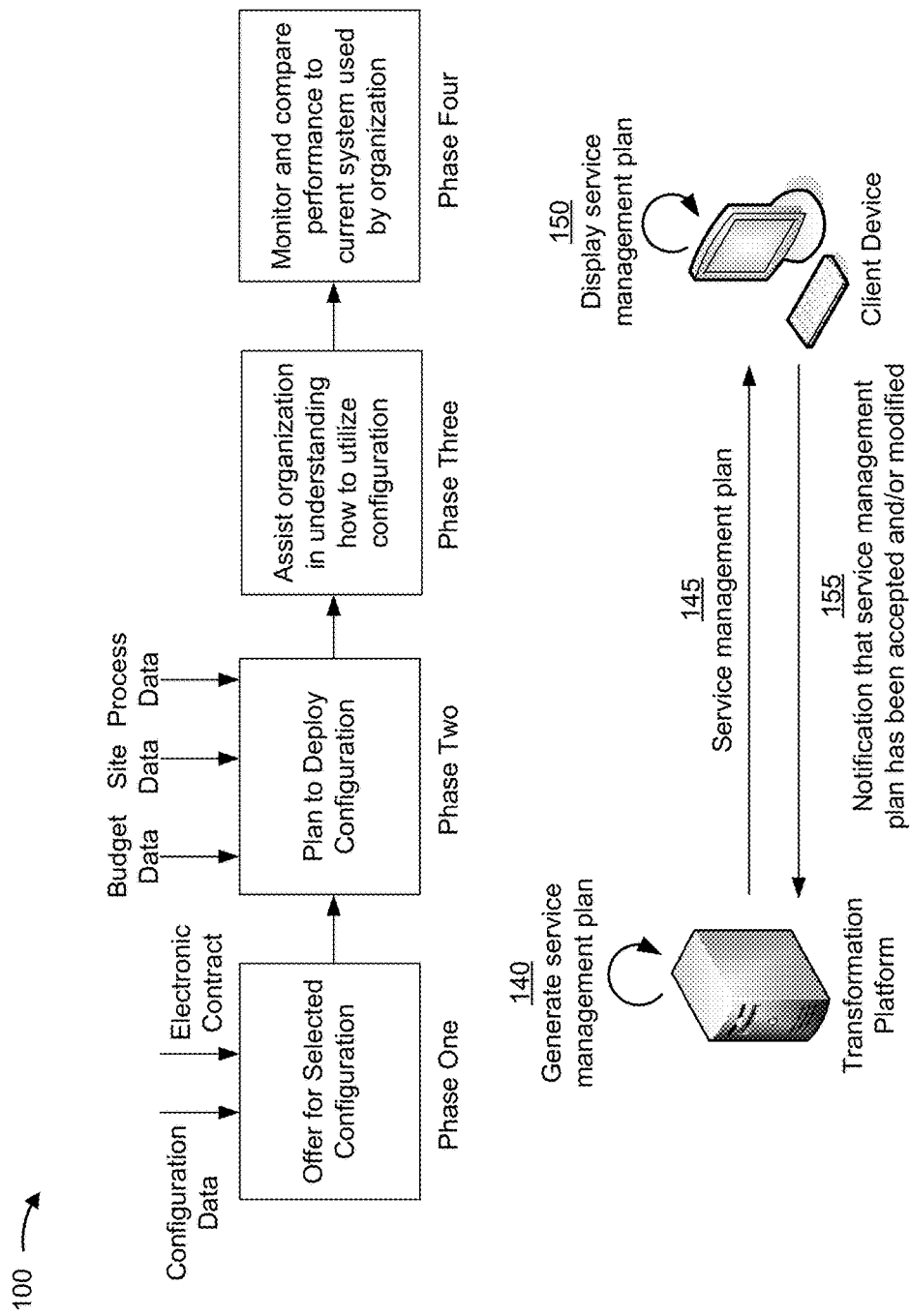

As shown in FIG. 1D, and by reference number 140, the transformation platform may generate the service management plan. For example, the transformation platform may generate the service management plan (referred to hereafter as the plan) based on the selected configuration. The plan may include one or more phases, such as a first phase of the plan that describes an offer for the configuration that has been selected, a second phase of the plan that describes a manner in which to implement the configuration, a third phase of the plan that describes how to use the set of service management tools included in the configuration, a fourth phase of the plan that describes a manner in which to measure performance of the fully-integrated ERP system relative to the current ERP system of the organization (and/or one or more benchmarked systems), and/or the like.

In some implementations, the transformation platform may generate a first phase of the plan that describes the offer for the configuration that has been selected. For example, the transformation platform may generate, as part of the first phase, an offer for the configuration. In this case, the transformation platform may populate fields of an electronic contract with information about the organization, may populate fields of the electronic contract that describe the set of service management tools and/or the one or more environments that are to be included in the configuration, may populate fields of the electronic contract that describe a cost to purchase the configuration (e.g., one or more service management tools may require a license, one or more default service management tools may need to be customized, one or more automation tools may need to be created, etc.), may populate one or more fields of the electronic contract that describe terms and conditions and other relevant parts of the contract, and/or the like.

Additionally, or alternatively, the transformation platform may generate a second phase of the plan that describes a manner in which to implement the configuration. For example, the transformation platform may generate, as part of the second phase of the plan, a set of instructions that describe how the set of service management tools of the configuration will be configured and deployed, a set of instructions that describe a recommended way to use the set of service management tools, a timeline that indicates when to implement the configuration, and/or the like.

In some implementations, the transformation platform may generate the set of instructions that describe how the set of service management tools will be configured and deployed. For example, the transformation platform may have an autoconfiguration and deployment module that is able to automatically configure and deploy the set of service management tools within the one or more environments of the fully-integrated ERP system. As such, the transformation platform may generate the set of instructions to describe how the autoconfiguration and deployment module will be able to automatically configure and deploy the set of service management tools.

Additionally, or alternatively, the transformation platform may generate the set of instructions that describe the recommended way to use the service of service management tools. For example, the transformation platform may have access to site data of one or more organization sites that support devices that will need to access the fully-integrated ERP system, the organizational data, the observation data, the priorities data, and/or the like. In this case, the transformation platform may, based on the data described above, map particular sites within the organization to particular service management tools, based on the sites being identified as having a need for the particular service management tools. Additionally, the transformation platform may use the mappings to generate the instructions describing the recommended way to use the service management tools.

Additionally, or alternatively, the transformation platform may generate a timeline that indicates when to implement the configuration. For example, a first service management tool may need to have additional code designed to customize the first service management tool to the organization and a second service management tool may be an automation tool that has to be designed from scratch. In this example, these tools may be unable to be deployed until development of the tools has been completed. Thereby, the service management tool may generate a timeline that projects when each respective tool may be deployed.

In some cases, the transformation platform may consider a budget of the organization when generating the timeline. For example, the transformation platform may have access to budget data of the organization, cost data that identifies a cost associated with implementing the configuration, and/or one or more other data types described elsewhere herein. In this case, the transformation platform may generate a timeline that allows the implementation of the configuration to be performed over time, in a manner that does not cause undue restrain to the budget of the organization.

Additionally, or alternatively, the transformation platform may generate a third phase of the plan that describes how to use the set of service management tools. For example, the transformation platform may have access to scheduling data that indicates schedules of a group of users that are working for the organization, systems data describing the current ERP system used within the organization, and/or one or more other data types described elsewhere herein. In this case, the transformation platform may identify a set of differences between the current ERP system and the fully-integrated ERP system and may generate one or more onboarding procedures to assist the group of users in learning how to effectively use the set of service management tools offered by the fully-integrated ERP system. Additionally, the transformation platform may, based on the scheduling data, schedule the group of users for a presentation describing the one or more onboarding procedures.

Additionally, or alternatively, the transformation platform may generate a fourth phase of the plan that describes a manner in which to measure performance of the fully-integrated ERP system (e.g., relative to the current ERP system of the organization, a benchmarked system, etc.). For example, the transformation platform may generate a fourth phase of the plan that describes how the fully-integrated ERP system is going to be monitored, that describes types of performance indicators that are going to be generated while the fully-integrated ERP system is being monitored, and/or the like. As an example, the service management plan may, after the fully-integrated ERP system has been deployed, receive new performance indicator data for the organization. In this example, the transformation platform may compare the new performance indicator data to the corresponding performance indicator data for the organization during times when the current ERP system of the organization was being utilized. This may allow the service management plan to measure system and business level improvements that are caused by implementing the configuration of the fully-integrated ERP system.

As shown by reference number 145, the transformation platform may provide the plan to the client device. For example, the transformation platform may use a communication interface (e.g., an application programming interface (API), another type of communication interface, etc.) to provide the plan to the client device.

As shown by reference number 150, the client device may provide the service management plan for display. For example, the client device may provide the service management plan for display such that a user may view the plan, accept one or more phases of the plan, modify one or more phases of the plan, remove one or more phases of the plan, and/or the like.

As shown by reference number 155, the client device may provide, to the transformation platform, a notification that the plan has been accepted and/or modified. For example, provide the notification via the communication interface described above.

While some implementations show the transformation platform as providing the client device with a complete plan, in other implementations, the transformation platform may be configured to send individual phases of the plan to the client device. For example, the transformation platform may generate the first phase of the plan and may provide the first phase of the plan to the client device. After the client device accepts the first phase of the plan, the transformation platform may generate the second phase of the plan and may provide the second phase of the plan to the client device. In cases where the client device provides feedback and changes one or more aspects of a phase of the plan, this conserves resources (e.g., processing resources, network resources, and/or the like) relative to transmitting the complete plan over to the client device during the first transmission (e.g., because changes made to a first phase of the plan will impact what the service management plan generates during a subsequent phase of the plan).

In this way, the transformation platform is able to generate and provide the client device with the service management plan.

Figure 1E:
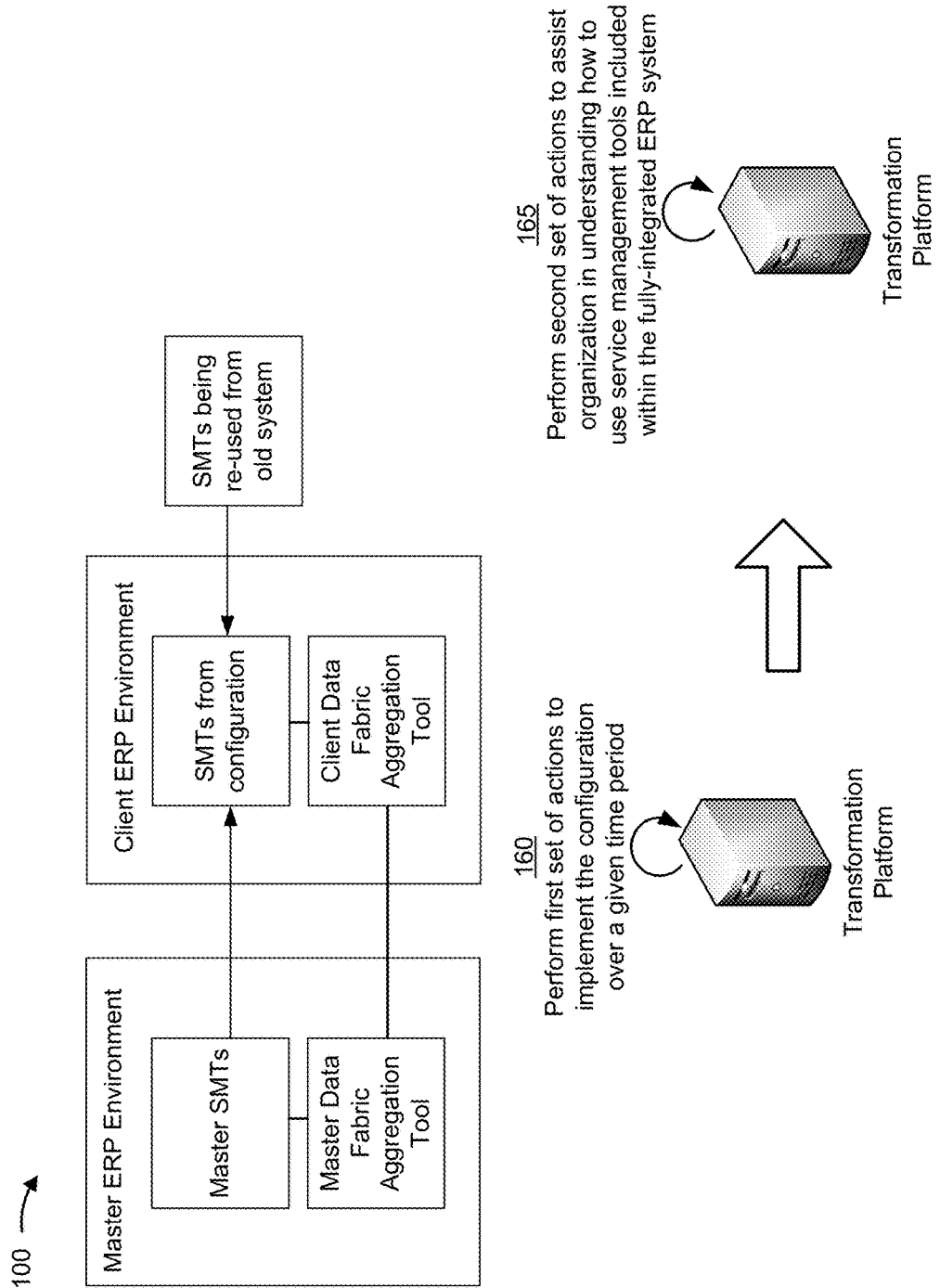

As shown in FIG. 1E, and by reference number 160, the transformation platform may perform a first set of actions to implement the configuration over a given time period. For example, the transformation platform may use the autoconfiguration and deployment module to automatically configure and deploy an initial configuration of the fully-integrated ERP system, and may, over the given time period, perform actions to complete the configuration of the fully-integrated ERP system.

In some implementations, the transformation platform may use the autoconfiguration and deployment module to automatically configure and deploy the initial configuration of the fully-integrated ERP system. For example, the transformation platform may configure one or more virtual machines to host the fully-integrated ERP system, may perform a set of configuration procedures to prepare the fully-integrated ERP system for deployment, may provision the one or more environments of the fully-integrated ERP system with the set of service management tools, and may instruct a group of servers that are hosting the one or more virtual machines to deploy the one or more environments in a manner that is accessible to devices of the organization, as each described below.

In some implementations, the transformation platform may configure the one or more virtual machines to host the fully-integrated ERP system. For example, the transformation platform may obtain a system image of an ERP package that includes the configuration (e.g., the one or more environments, the set of service management tools, etc.) and may interact with an interface of a cloud services provider (e.g., a web interface) to configure one or more virtual machines that are to host the fully-integrated ERP system. In this case, the transformation platform may upload the system image, and may interact with the interface to establish an account for the organization with the cloud services provider, may input site data and other relevant infrastructure data for the organization, and/or the like. The site data may allow a backend server of the cloud services provider to select optimal servers to support the one or more virtual machines (e.g., based on geographic location, etc.) and the other relevant infrastructure data may be used to establish other aspects of cloud-based support (e.g., establishing a virtual private network (VPN), a VPN subnet, data indicating an amount of resources to allocate to the virtual machines, and/or the like).

In some implementations, the transformation platform may perform the set of configuration procedures to prepare the fully-integrated ERP system for deployment. For example, if the fully-integrated ERP system is an SAP ERP system, the transformation platform may establish one or more paths (e.g., transport request paths) that permit data transmission between environments (e.g., environments within the SAP ERP system, an environment within the SAP ERP system and an environment outside the SAP ERP system, and/or the like). Additionally, or alternatively, the transformation platform may create user profiles for one or more users of the organization, may check for installation errors, may obtain licenses needed to utilize particular service management tools, and/or may perform any other actions needed to prepare the one or more environments and the set of service management tools for deployment.

In some implementations, the transformation platform may provision the one or more environments of the fully-integrated ERP system with the set of service management tools. For example, if a first set of service management tools are being re-used from the current ERP system of the organization (hereafter referred to as the old ERP system of the organization), the transformation platform may provision the first set of service management tools (and may re-use any existing licenses that had been previously obtained by the organization). Additionally, or alternatively, the transformation platform may provision a second set of service management tools that are part of a master set of service management tools. For example, a master ERP environment may support a master set of service management tools that are used across all organizations, and the transformation platform may reference the master set of service management tools to provision the second set of service management tools within the one or more environments.

In some implementations, the transformation platform may instruct the group of servers that are hosting the one or more virtual machines to deploy the one or more environments in a manner that is accessible to devices of the organization. For example, the transformation platform may provide deployment instructions to the one or more virtual machines to cause the one or more virtual machine to deploy the one or more environments.

In some implementations, the transformation platform may, over the given time period, perform one or more actions to complete the configuration of the fully-integrated ERP system. For example, the second phase of the plan may include instructions to create customized code for particular service management tools, instructions to create new service management tools (e.g., new automation tools, etc.), and/or the like. In this case, software engineers of the organization (or of a contracted organization) may create the customized code and/or the new service management tools over the given time period (e.g., using a development environment within the fully-integrated ERP system). When customized code and/or an automation tool is ready for configuration and deployment, the transformation platform may use the autoconfiguration and deployment module to integrate the customized code and/or the automation tool into one or more other environments of the fully-integrated ERP system.

As shown by reference number 165, the transformation platform may perform a second set of actions to assist the organization in understanding how to use the set of service management tools included in the fully-integrated ERP system. For example, the transformation platform may provide one or more devices associated with the organization with access to demonstration tools that allow users to understand how to use each service management tool (e.g., using a virtual agent, using a video demonstration, using an online presentation, and/or the like). The demonstration tools may walk users through how to log into a service management tool, how to navigate through one or more interfaces of the service management tool, how to use one or more features of the service management tool that are different than features of a corresponding service management tool used within the old ERP system of the organization, and/or the like. Additionally, or alternatively, the transformation platform may provide the one or more devices with access to utilization tools that track the organization's utilization of each service management tool. Access to the demonstration tools and/or utilization tools may be provided by deploying these tools to the fully-integrated ERP system and/or may deploying these tools on the one or more devices associated with the organization.

While the demonstration tools and utilization tools are described as being separate from the service management tools, it is to be understood that this is only because the demonstration tools and/or the utilization tools are analyzing data generated from other service management tools, and that the demonstration tools and utilization tools are actually part of the set of service management tools available to the transformation platform.

In this way, the transformation platform is able to implement the configuration of the fully-integrated ERP system.

Figure 1F:
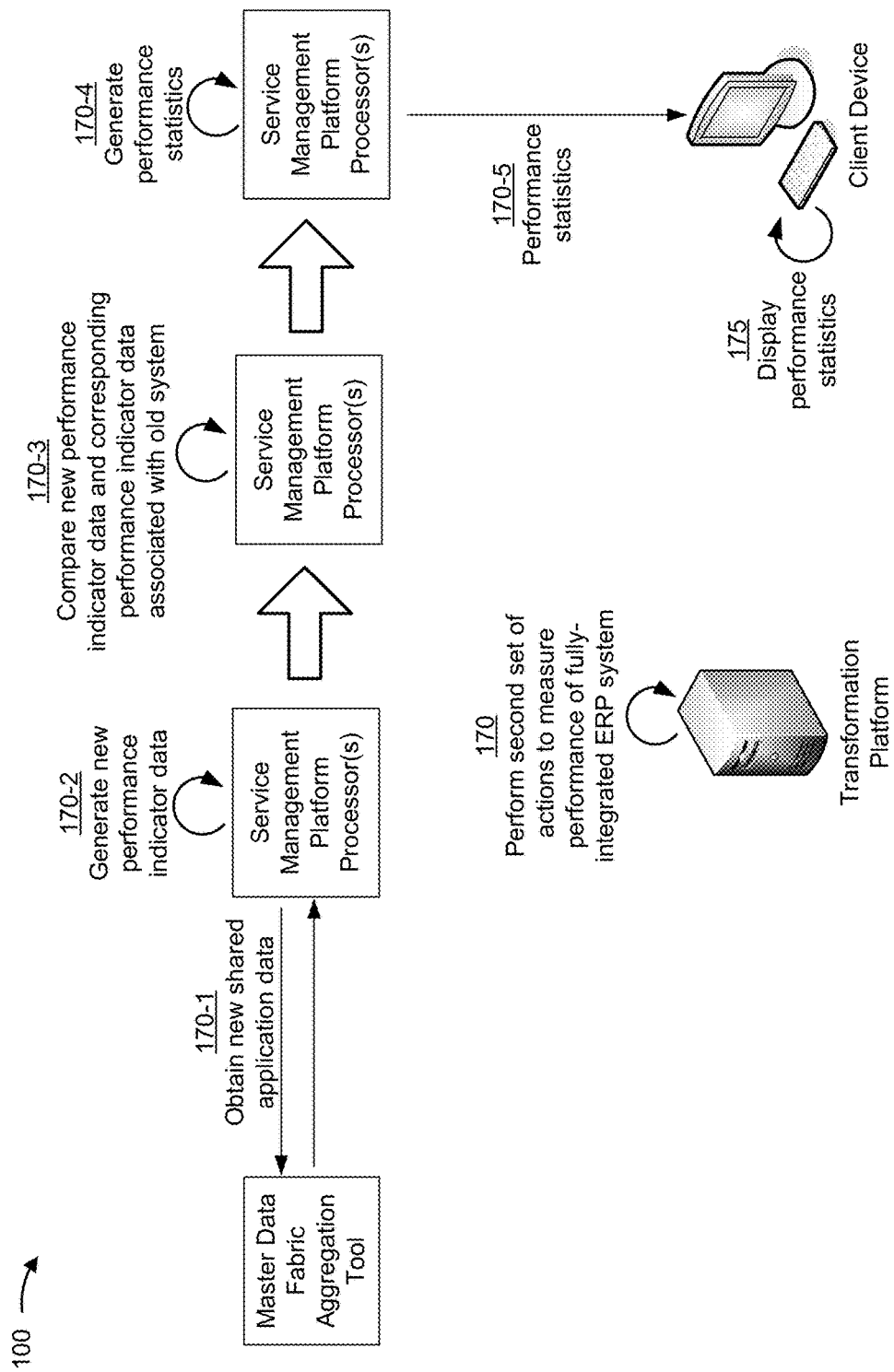

As shown in FIG. 1F, and by reference number 170, the transformation platform may perform a second set of actions to measure performance of the fully-integrated ERP system. For example, and as shown by reference number 170-1, the transformation platform may obtain new shared application data associated with the set of service management tools. In this case, as the organization uses the set of service management tools to generate new shared application data, the new shared application data may be provided to the data fabric aggregation tool within the fully-integrated ERP system, converted to a uniform format, and provided to the master data fabric aggregation tool. This may allow the transformation platform to obtain the new shared application data from the master data fabric aggregation tool.

As shown by reference number 170-2, the transformation platform may generate new performance indicator data. For example, the transformation platform may analyze the new shared application data to generate new performance indicator data for performance indicators described elsewhere herein. In some cases, one or more devices associated with the organization may generate the new performance indicator data and may provide the new performance indicator data to the transformation platform.

As shown by reference number 170-3, the transformation platform may compare the new performance indicator data and the corresponding performance indicator data associated with the old ERP system of the organization. As shown by reference number 170-4, the transformation platform may generate performance statistics based on the comparison described above. The performance statistics may indicate a degree to which particular performance indicators have changed (e.g., improved) over time. Additionally, or alternatively, the transformation platform may generate performance statistics that are based on a comparison to one or more baselines or industry standards.

As shown by reference number 170-5, the transformation platform may provide performance statistics data that identifies the performance statistics to the client device. For example, the transformation platform may use the communication interface to provide the performance statistics in a manner that is accessible to the client device. In this case, and as shown by reference number 175, an interface of the client device may display the performance statistics. For example, the transformation platform may configure and deploy one or more analytics tools to the fully-integrated ERP system and may use the one or more analytics tools to display the performance statistics data via an interface that may be accessed by the client device. This may allow users to view the performance statistics, make decisions based on the performance statistics, and/or the like. In this way, the organization is able to track improvements to system-based and process-based performance indicators based on implementing the fully-integrated ERP system.

In some implementations (not shown), the transformation platform may perform one or more additional actions. For example, over time, new changes will need to be made to the fully-integrated ERP system. As an example, as the set of service management tools become more customized, a time needed to upgrade the set of service management tools and/or environments supporting the set of service management tools may increase. To account for this, the transformation platform may modify one or more phases of the plan to reflect the increase in time, to mitigate against potential issues that may rise when the time to upgrade the set of service management tools increases, and/or the like.

As another example, if a level of customization of the set of service management tools reaches 100% or a threshold percentage, the transformation platform may determine that there is no longer a need to generate performance indicators data relating to customization. This may cause the service management to stop generating performance indicators data relating to customization, to instruction devices of the organization to stop generating performance indicators data relating to customization, and/or the like. This conserves resources (e.g., processing resources, network resources, and/or the like) that would otherwise be wasted generating performance indicator data that would not be useful for improving the fully-integrated ERP system.

In some implementations, rather than configure and deploy the fully-integrated ERP environment, the transformation platform may update the current ERP system of the organization, such that the current ERP system is able to operate in a manner consistent with the fully-integrated ERP system. In some implementations, the transformation platform may configure and deploy the fully-integrated ERP environment with a first set of service management tools and may configure and deploy a second set of service management tools on the current ERP system of the organization.

In this way, the transformation platform is able to generate and implement the plan in a manner that ensures efficient and effective utilization of resources of the fully-integrated ERP system.

As indicated above, FIGS. 1A-1F are provided merely as one or more examples. Other examples may differ from what is described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple and/or distributed devices. Additionally, or alternatively, a set of devices (e.g., one or more devices) of example implementation 100 may perform one or more functions described as being performed by another set of devices of example implementation 100.

Figure 2A:
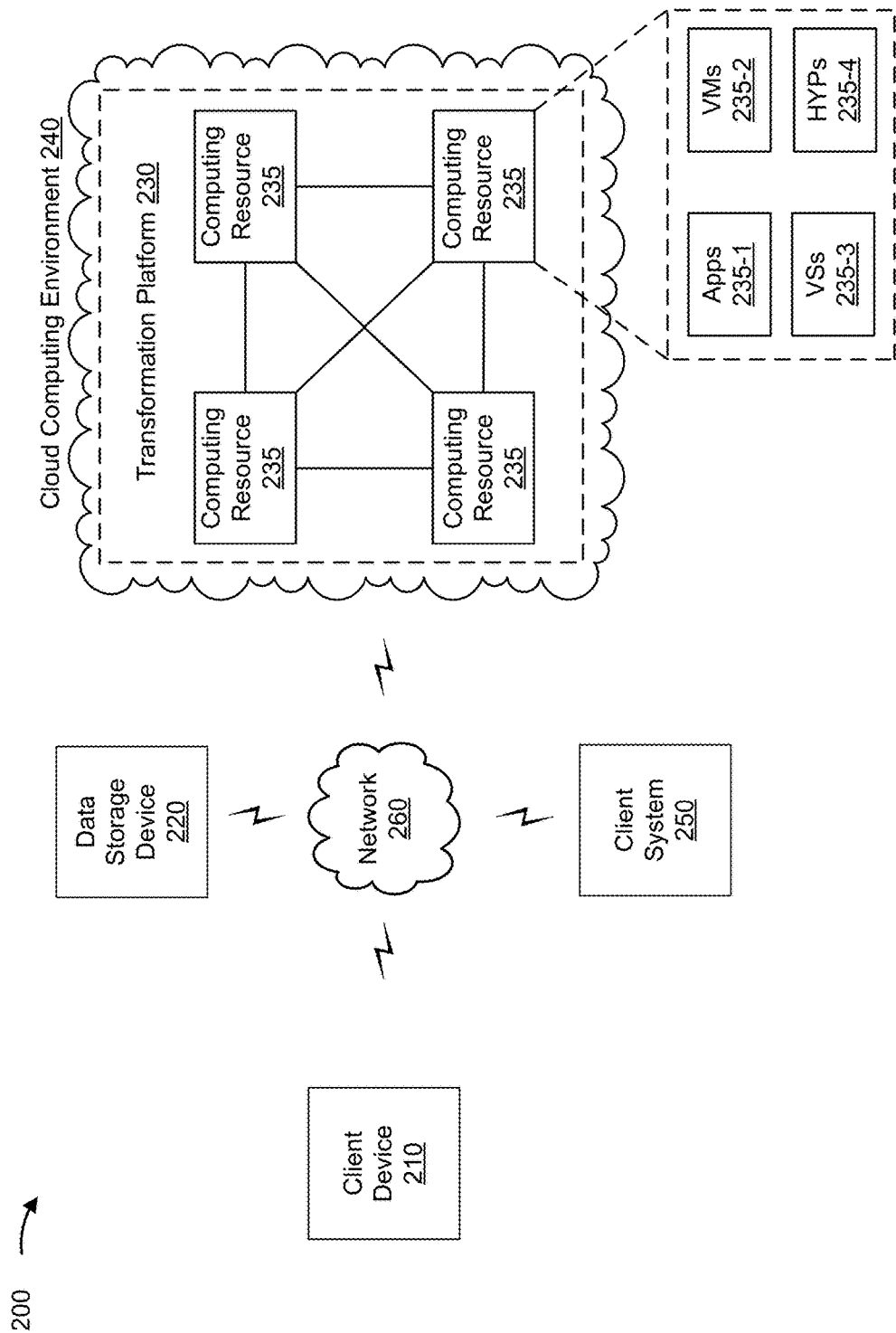
FIGS. 2A and 2B are diagrams of an example environment in which systems and/or methods described herein may be implemented.
Figure 2B:
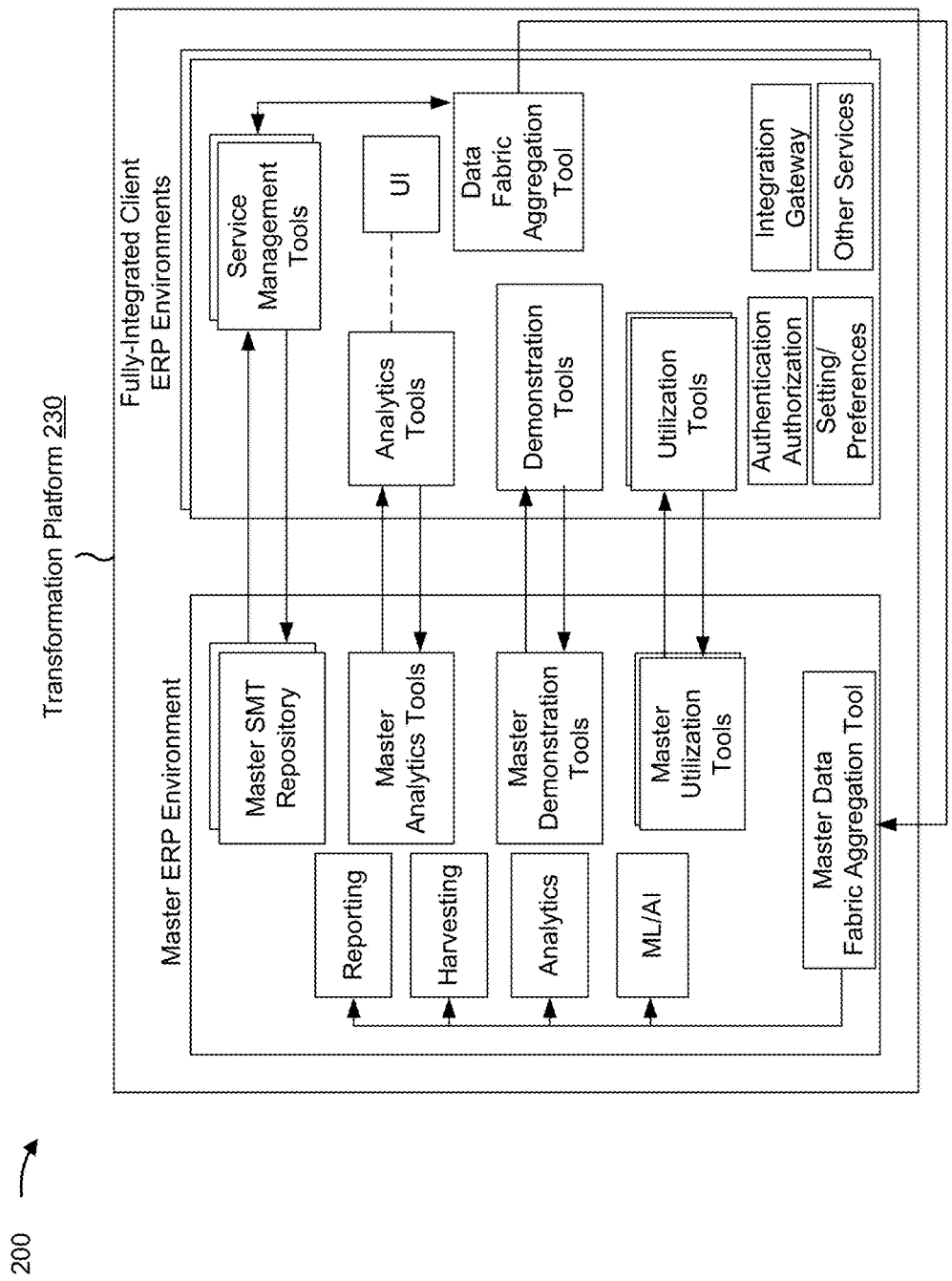

FIGS. 2A and 2B are diagrams of an example environment 200 in which systems and/or methods described herein may be implemented. As shown in FIG. 2A, environment 200 may include a client device 210, a data storage device 220, a transformation platform 230 hosted within a cloud computing environment 240, a client system 250, and/or a network 260. Devices of environment 200 may interconnect via wired connections, wireless connections, or a combination of wired and wireless connections.

Client device 210 includes one or more devices capable of receiving, generating, storing, processing, and/or providing information associated with a service management plan and/or a fully-integrated enterprise resource planning (ERP) system. For example, client device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device.

In some implementations, client device 210 may provide, to transformation platform 230, a request for a service management plan. In some implementations, client device 210 may receive the service management plan from transformation platform 230. In some implementations, client device 210 may display the service management plan via an interface. In some implementations, client device 210 may provide transformation platform 230 with a notification indicating that the service management plan has been accepted and/or modified. In some implementations, client device 210 may receive performance statistics from transformation platform 230. In some implementations, client device 210 may display the performance statistics via an interface.

Data storage device 220 includes one or more devices capable of receiving, storing, generating, determining, and/or providing information associated with an ERP system (e.g., a current ERP system of an organization, a fully-integrated ERP system, etc.). For example, data storage device 220 may include a server device or a group of server devices. In some implementations, data storage device 220 may use one or more data structures to store data, such as a database (e.g., a relational database), a linked-list, an array, a tree, a graph, a taxonomy, and/or a similar type of data structure. In some implementations, a first data storage device 220 may store organizational data for an organization. In some implementations, a second data storage device 220 may store shared application data for a set of service management tools that are supported by a fully-integrated ERP system, performance indicator data for performance indicators generated while the fully-integrated ERP system is implemented, and/or the like.

Transformation platform 230 includes one or more devices capable of receiving, storing, generating, determining, and/or providing information associated with a service management plan. For example, transformation platform 230 may include a server device (e.g., a host server, a web server, an application server, etc.), a data center device, or a similar device. In some implementations, transformation platform 230 may support a master ERP environment and/or a set of ERP environments that are used within a set of fully-integrated ERP systems. Additional architectural details relating to transformation platform 230 is provided in FIG. 2B.

In some implementations, transformation platform 230 may train a data model and/or may receive a trained data model. In some implementations, transformation platform 230 may use the data model to process requests made by client device 210.

In some implementations, as shown, transformation platform 230 may be hosted in cloud computing environment 240. Notably, while implementations described herein describe transformation platform 230 as being hosted in cloud computing environment 240, in some implementations, transformation platform 230 might not be cloud-based (i.e., may be implemented outside of a cloud computing environment) or may be partially cloud-based.

Cloud computing environment 240 includes an environment that hosts transformation platform 230. Cloud computing environment 240 may provide computation, software, data access, storage, etc. services that do not require end-user knowledge of a physical location and configuration of system(s) and/or device(s) that hosts transformation platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host transformation platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2A, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by client device 210, data storage device 220, and/or client system 250. Application 235-1 may eliminate a need to install and execute the software applications on these devices. For example, application 235-1 may include software associated with transformation platform 230 and/or any other software capable of being provided via cloud computing environment 240. In some implementations, one application 235-1 may send/receive information to/from one or more other applications 235-1, via virtual machine 235-2. In some implementations, application 235-1 may include a set of applications that include functions and/or features used to provide one or more services described herein. For example, the set of applications 235-1 may provide insight gathering services, enterprise value services, service management plan creation services, solution design services, solution demonstration services, solution delivery services, insights and analytics services, and/or one or more services that may be used to perform implementations described herein.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., client device 210, data storage device 220, client system 250, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Client system 250 includes one or more devices capable of receiving, storing, generating, determining, and/or providing information associated with an ERP system. For example, ERP system 250 may include a server device or a group of server devices. In some implementations, client system 250 may be an ERP system, such as a Systems Applications and products (SAP) ERP system or a similar type of ERP system. In some implementations, client system 250 may a fully-integrated ERP system. In some implementations, client system 250 may include one or more environments that support a set of service management tools, a data fabric aggregation tool that is able to convert shared application data generated by the set of service management tools to a uniform format, and/or any other type of tool described elsewhere herein (e.g., a demonstration tool, an analytics tool, a utilization tool, and/or the like).

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

As shown in FIG. 2B, transformation platform 230 may (e.g., using computing resource 235)) support a master ERP environment and a set of fully-integrated ERP environments associated with particular organizations. For example, transformation platform 230 may support a master environment that includes a master set of service management tools, a master set of analytics tools, a master set of demonstration tools, a master set of utilization tools, and a master data fabric aggregation tool. In this case, the master data fabric aggregation tool may include a reporting module, a data harvesting module, an analytics module, a machine learning and artificial intelligence module, and/or the like. The set of fully-integrated ERP environments may each include a set of service management tools, a set of analytics tools, a set of demonstration tools, a set of utilization tools, a user interface module, a data fabric aggregation tool, an authentication and authorization module, a settings and preferences module, an integration gateway service, and/or one or more other services.

In some implementations, a set of service management tools of a fully-integrated ERP environment may be a subset of the master set of service management tools that are offered within the master ERP environment. In some implementations, the set of service management tools may generate shared application data. In some implementations, the set of service management tools may provide the shared application data to a data fabric aggregation tool. For example (not shown), the set of service management tools may convert the shared application data to a uniform format, and may use the integration gateway service to provide the shared application data to the master data fabric aggregation tool. This may allow transformation platform 230 to access the shared application data and to use one or more modules of the master data fabric aggregation tool to perform one or more actions described herein.

The number and arrangement of devices and networks shown in FIGS. 2A and 2B are provided as one or more examples. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
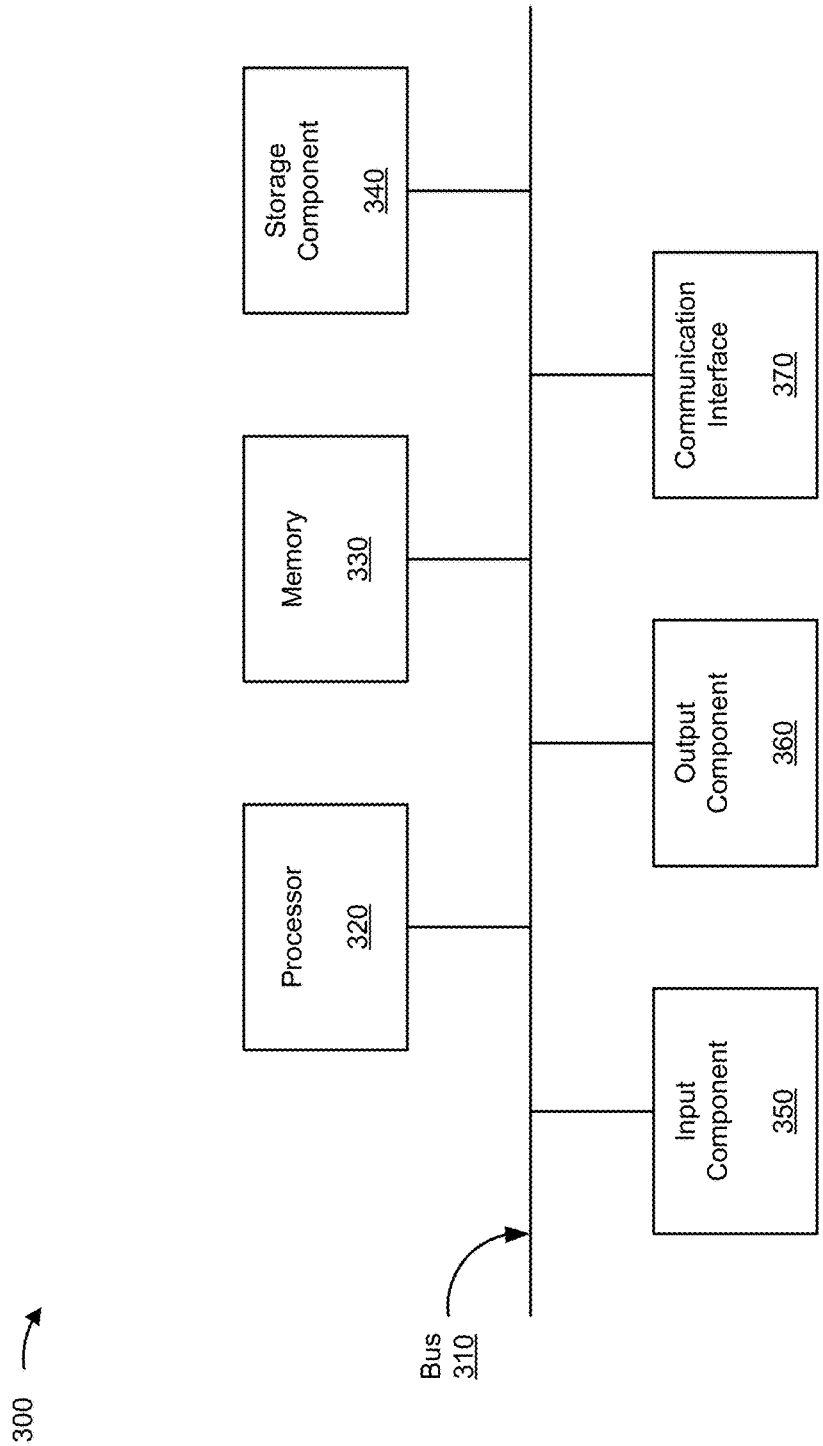
FIG. 3 is a diagram of example components of one or more devices of FIG. 2A.

FIG. 3 is a diagram of example components of a device 300. Device 300 may correspond to client device 210, data storage device 220, transformation platform 230, and/or client system 250. In some implementations, client device 210, data storage device 220, transformation platform 230, and/or client system 250 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
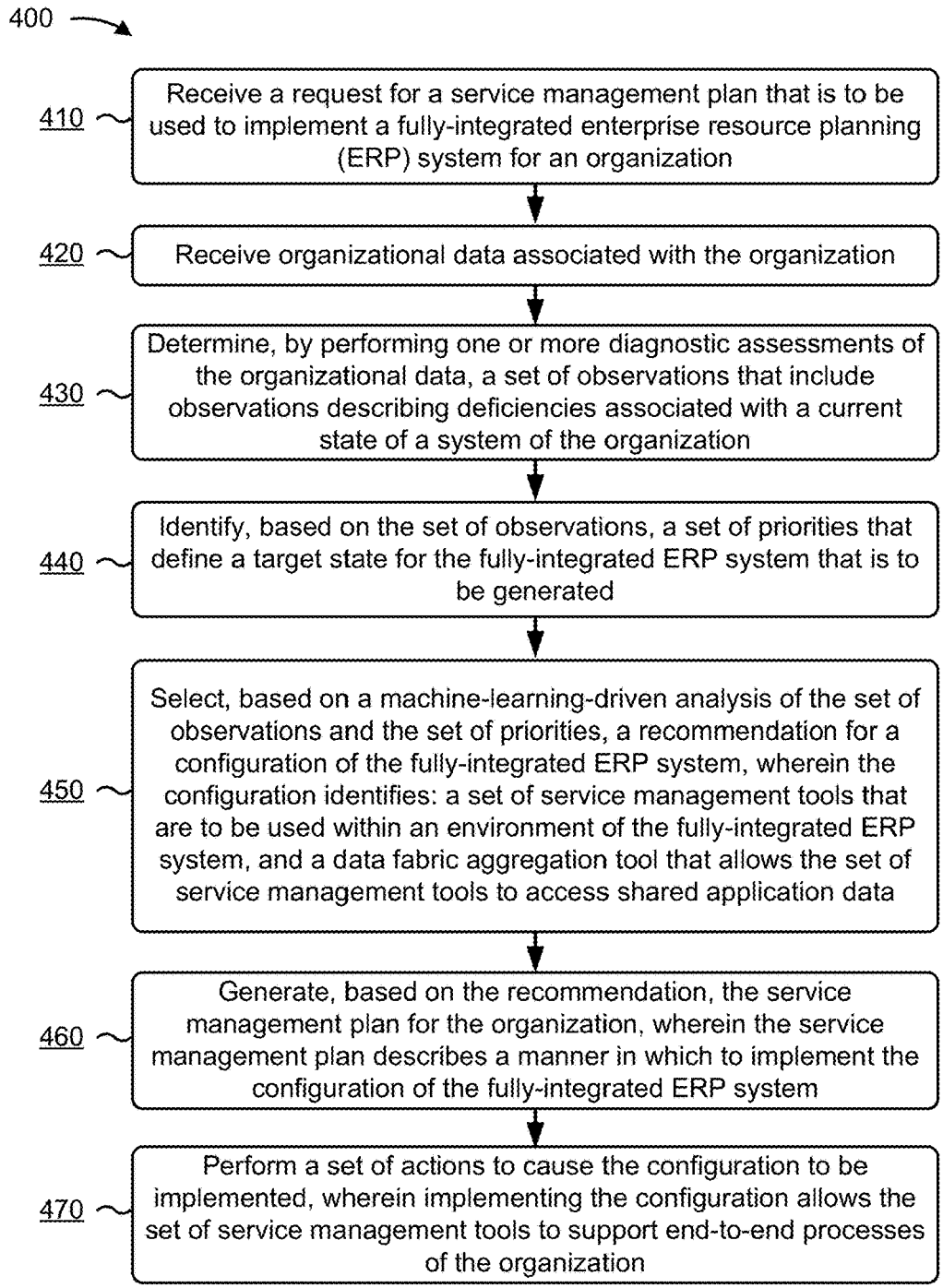
FIGS. 4-6 are flowcharts of an example process for generating and implementing a service management plan.

FIG. 4 is a flow chart of an example process 400 for generating and implementing a service management plan. In some implementations, one or more process blocks of FIG. 4 may be performed by a transformation platform (e.g., transformation platform 230). In some implementations, one or more process blocks of FIG. 4 may be performed by another device or a group of devices separate from or including the transformation platform, such as a client device (e.g., client device 210), a data storage device (e.g., data storage device 220), and/or a client system (e.g., client system 250).

As shown in FIG. 4, process 400 may include receiving a request for a service management plan that is to be used to implement a fully-integrated enterprise resource planning (ERP) system for an organization (block 410). For example, the transformation platform (e.g., using computing resource 235, processor 320, memory 330, storage component 340, input component 350, communication interface 370, and/or the like) may receive a request for a service management plan that is to be used to implement a fully-integrated enterprise resource planning (ERP) system for an organization, as described above.

As further shown in FIG. 4, process 400 may include receiving organizational data associated with the organization (block 420). For example, the transformation platform (e.g., using computing resource 235, processor 320, memory 330, storage component 340, input component 350, communication interface 370, and/or the like) may receive organizational data associated with the organization, as described above.

As further shown in FIG. 4, process 400 may include determining, by performing one or more diagnostic assessments of the organizational data, a set of observations that include observations describing deficiencies associated with a current state of a system of the organization (block 430). For example, the transformation platform (e.g., using computing resource 235, processor 320, memory 330, storage component 340, and/or the like) may determine, by performing one or more diagnostic assessments of the organizational data, a set of observations that include observations describing deficiencies associated with a current state of a system of the organization (e.g., client system 250), as described above.

As further shown in FIG. 4, process 400 may include identifying, based on the set of observations, a set of priorities that define a target state for the fully-integrated ERP system that is to be generated (block 440). For example, the transformation platform (e.g., using computing resource 235, processor 320, memory 330, storage component 340, and/or the like) may identify, based on the set of observations, a set of priorities that define a target state for the fully-integrated ERP system that is to be generated, as described above.

As further shown in FIG. 4, process 400 may include selecting, based on a machine-learning-driven analysis of the set of observations and the set of priorities, a recommendation for a configuration of the fully-integrated ERP system, wherein the configuration identifies a set of service management tools that are to be used within an environment of the fully-integrated ERP system and a data fabric aggregation tool that allows the set of service management tools to access shared application data (block 450). For example, the transformation platform (e.g., using computing resource 235, processor 320, memory 330, storage component 340, and/or the like) may select, based on a machine-learning-driven analysis of the set of observations and the set of priorities, a recommendation for a configuration of the fully-integrated ERP system. In some implementations, the configuration may identify a set of service management tools that are to be used within an environment of the fully-integrated ERP system and a data fabric aggregation tool that allows the set of service management tools to access shared application data, as described above.

As further shown in FIG. 4, process 400 may include generating, based on the recommendation, the service management plan for the organization, wherein the service management plan describes a manner in which to implement the configuration of the fully-integrated ERP system (block 460). For example, the transformation platform (e.g., using computing resource 235, processor 320, memory 330, storage component 340, and/or the like) may generate, based on the recommendation, the service management plan for the organization, as described above. In some implementations, the service management plan may describe a manner in which to implement the configuration of the fully-integrated ERP system.

As further shown in FIG. 4, process 400 may include performing a set of actions to cause the configuration to be implemented, wherein implementing the configuration allows the set of service management tools to support end-to-end processes of the organization (block 470). For example, the transformation platform (e.g., using computing resource 235, processor 320, memory 330, storage component 340, input component 350, output component 360, communication interface 370, and/or the like) may perform a set of actions to cause the configuration to be implemented. In some implementations, implementing the configuration may allow the set of service management tools to support end-to-end processes of the organization, as described above.

Process 400 may include additional implementations, such as any single implementation or any combination of implementations described below and/or in connection with one or more other processes described elsewhere herein.

In some implementations, when performing the set of actions, the transformation platform may configure, as part of the fully-integrated ERP system, the data fabric aggregation tool with a feature that converts the shared application data to a uniform format. In some implementations, the set of observations include at least one of: a first set of observations that indicate an amount of customization used within tools that are part of the system of the organization, a second set of observations that indicate an amount of automation used by tools that are part of the system of the organization, a third set of observations that indicate whether the tools that are part of the system are scalable, or a fourth set of observations that identify one or more services that are not provided by the tools that are part of the system.

In some implementations, when identifying the set of priorities that define the target state, the transformation platform may compare the set of deficiencies of the system and a set of properties of one or more systems associated with other organizations, and may identify one or more priorities, of the set of priorities, based on comparing the set of deficiencies and the set of properties.

In some implementations, when selecting the recommendation, the transformation platform may provide, as input to a data model that has been trained using one or more machine learning techniques, observation data that identifies the set of observations and priorities data that identifies the set of priorities, to cause the data model to output a set of scores that indicate likelihoods of recommendations for particular configurations causing a state of the fully-integrated ERP system to be the target state. Additionally, the transformation platform may select the recommendations for the configuration, of the recommendations for the particular configurations, based on the recommendation for the configuration being associated with a score that indicates a highest likelihood of causing the state of the fully-integrated ERP system to be the target state.

In some implementations, the transformation platform may generate, before receiving the request, a templated configuration for fully-integrated ERP systems used within a particular industry. In some implementations, when selecting the recommendation, the transformation platform may identify the templated configuration based on the request including an industry identifier that indicates that the organization operates within the particular industry. Additionally, the transformation platform may modify one or more aspects of the templated configuration based on performing the machine-learning-driven analysis of the set of observations and the set of priorities. Additionally, the transformation platform may generate, as the recommendation for the configuration, a particular recommendation for the templated configuration that has been modified.

In some implementations, the transformation platform may monitor, after performing the set of actions to cause the configuration to be implemented, application data that is generated by the set of service management tools. In some implementations, the transformation platform may generate a set of network performance indicators based on the application data. In some implementations, the transformation platform may compare the set of network performance indicators to a corresponding set of network performance indicators that are part of the organizational data. In some implementations, the transformation platform may generate performance statistics based on comparing the set of network performance indicators and the corresponding set of network performance indicators. In some implementations, the transformation platform may provide the performance statistics for display via an interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
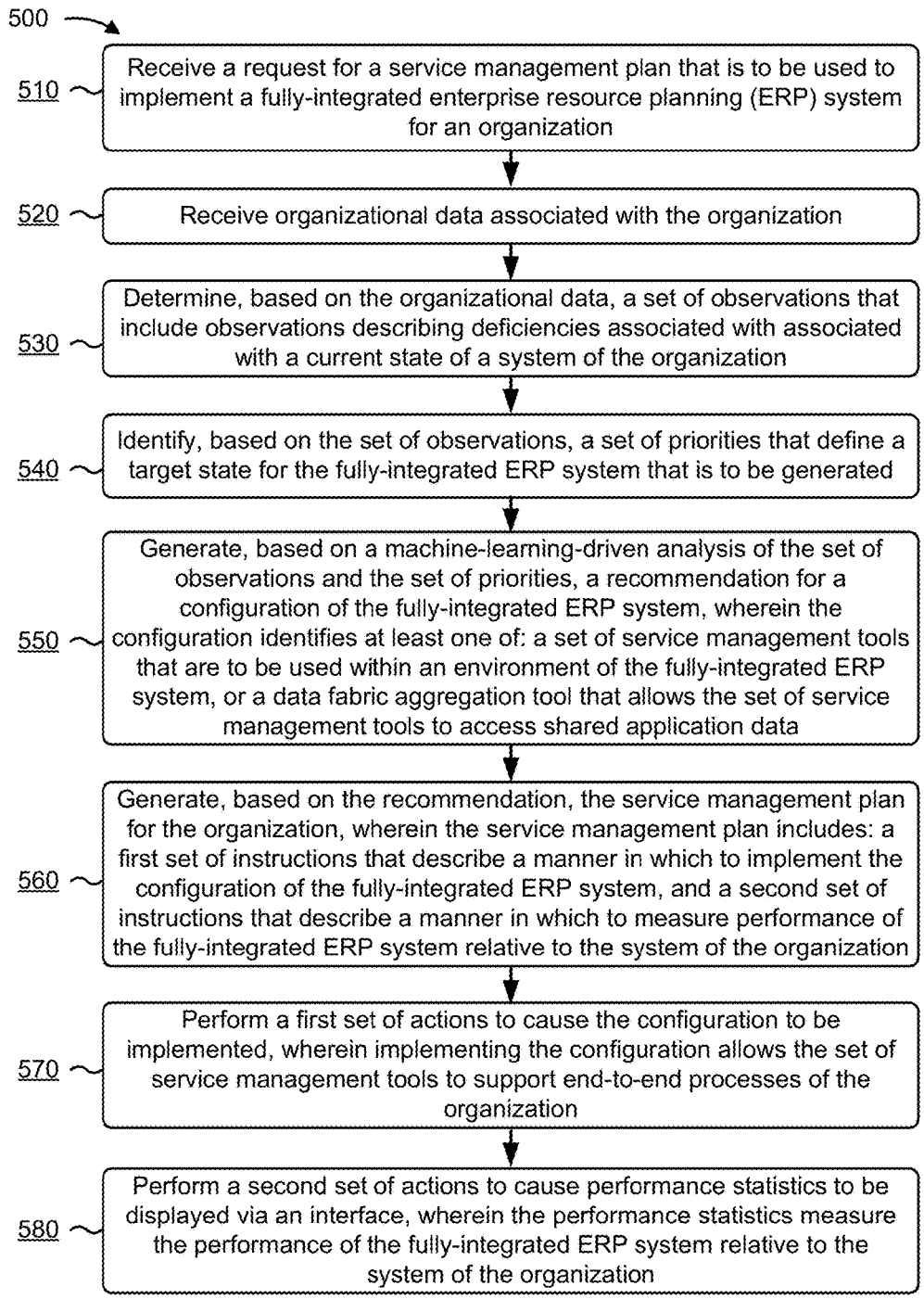

FIG. 5 is a flow chart of an example process 500 for generating and implementing a service management plan. In some implementations, one or more process blocks of FIG. 5 may be performed by a transformation platform (e.g., transformation platform 230). In some implementations, one or more process blocks of FIG. 5 may be performed by another device or a group of devices separate from or including the transformation platform, such as a client device (e.g., client device 210), a data storage device (e.g., data storage device 220), and/or a client system (e.g., client system 250).

As shown in FIG. 5, process 500 may include receiving a request for a service management plan that is to be used to implement a fully-integrated enterprise resource planning (ERP) system for an organization (block 510). For example, the transformation platform (e.g., using computing resource 235, processor 320, memory 330, storage component 340, input component 350, communication interface 370, and/or the like) may receive a request for a service management plan that is to be used to implement a fully-integrated enterprise resource planning (ERP) system for an organization, as described above.

As further shown in FIG. 5, process 500 may include receiving organizational data associated with the organization (block 520). For example, the transformation platform (e.g., using computing resource 235, processor 320, memory 330, storage component 340, input component 350, communication interface 370, and/or the like) may receive organizational data associated with the organization, as described above.

As further shown in FIG. 5, process 500 may include determining, based on the organizational data, a set of observations that include observations describing deficiencies associated with associated with a current state of a system of the organization (block 530). For example, the transformation platform (e.g., using computing resource 235, processor 320, memory 330, storage component 340, and/or the like) may determine, based on the organizational data, a set of observations that include observations describing deficiencies associated with associated with a current state of a system of the organization (e.g., client system 250), as described above.

As further shown in FIG. 5, process 500 may include identifying, based on the set of observations, a set of priorities that define a target state for the fully-integrated ERP system that is to be generated (block 540). For example, the transformation platform (e.g., using computing resource 235, processor 320, memory 330, storage component 340, and/or the like) may identify, based on the set of observations, a set of priorities that define a target state for the fully-integrated ERP system that is to be generated, as described above.

As further shown in FIG. 5, process 500 may include generating, based on a machine-learning-driven analysis of the set of observations and the set of priorities, a recommendation for a configuration of the fully-integrated ERP system, wherein the configuration identifies at least one of: a set of service management tools that are to be used within an environment of the fully-integrated ERP system, or and a data fabric aggregation tool that allows the set of service management tools to access shared application data (block 550). For example, the transformation platform (e.g., using computing resource 235, processor 320, memory 330, storage component 340, and/or the like) may generate, based on a machine-learning-driven analysis of the set of observations and the set of priorities, a recommendation for a configuration of the fully-integrated ERP system. In some implementations, the configuration may identify at least one of: a set of service management tools that are to be used within an environment of the fully-integrated ERP system, or and a data fabric aggregation tool that allows the set of service management tools to access shared application data, as described above.

As further shown in FIG. 5, process 500 may include generating, based on the recommendation, the service management plan for the organization, wherein the service management plan includes: a first set of instructions that describe a manner in which to implement the configuration of the fully-integrated ERP system, and a second set of instructions that describe a manner in which to measure performance of the fully-integrated ERP system relative to the system of the organization (block 560). For example, the transformation platform (e.g., using computing resource 235, processor 320, memory 330, storage component 340, and/or the like) may generate, based on the recommendation, the service management plan for the organization. In some implementations, the service management plan may include: a first set of instructions that describe a manner in which to implement the configuration of the fully-integrated ERP system, and a second set of instructions that describe a manner in which to measure performance of the fully-integrated ERP system relative to the system of the organization, as described above.

As further shown in FIG. 5, process 500 may include performing a first set of actions to cause the configuration to be implemented, wherein implementing the configuration allows the set of service management tools to support end-to-end processes of the organization (block 570). For example, the transformation platform (e.g., using computing resource 235, processor 320, memory 330, storage component 340, input component 350, output component 360, communication interface 370, and/or the like) may perform a first set of actions to cause the configuration to be implemented. In some implementations, implementing the configuration may allow the set of service management tools to support end-to-end processes of the organization, as described above.

As further shown in FIG. 5, process 500 may include performing a second set of actions to cause performance statistics to be displayed via an interface wherein the performance statistics measure the performance of the fully-integrated ERP system relative to the system of the organization (block 580). For example, the transformation platform (e.g., using computing resource 235, processor 320, memory 330, storage component 340, input component 350, output component 360, communication interface 370, and/or the like) may perform a second set of actions to cause performance statistics to be displayed via an interface. In some implementations, the performance statistics may measure the performance of the fully-integrated ERP system relative to the system of the organization, as described above.

Process 500 may include additional implementations, such as any single implementation or any combination of implementations described below and/or in connection with one or more other processes described elsewhere herein.

In some implementations, the one or more processors, when performing the first set of actions, the transformation platform may configure, as part of the fully-integrated ERP system, the data fabric aggregation tool with a feature that converts the shared application data to a uniform format. In some implementations, the transformation platform may update a master data fabric aggregation tool to store a copy of the shared application data. In some implementations, the master data fabric aggregation tool may also store copies of other shared application data of other organizations.

In some implementations, the transformation platform may determine the set of observations by performing one or more diagnostic assessments of the organizational data. In some implementations, the organizational data may include a set of performance indicators. In some implementations, at least one diagnostic assessment may be based on comparing the set of performance indicators and a set of industry performance benchmarks.

In some implementations, when generating the recommendation, the transformation platform may provide, as input to a data model that has been trained using one or more machine learning techniques, observation data that identifies the set of observations and priorities data that identifies the set of priorities, to cause the data model to output a set of scores that indicate likelihoods of recommendations for particular configurations causing a state of the fully-integrated ERP system to be the target state. In some implementations, the transformation platform may select the recommendation for the configuration, of the recommendations for the particular configurations, based on the recommendation for the configuration being associated with a score that indicates a highest likelihood of causing the state of the fully-integrated ERP system to be the target state.

In some implementations, the transformation platform may generate, before receiving the request, a templated configuration for fully-integrated ERP systems used within a particular industry. In some implementations, the templated configuration may be generated by using a data model that has been trained by using one or more machine learning techniques to analyze historical organizational data of organizations within the particular industry. In some implementations, when generating the recommendation, the transformation platform may identify the templated configuration based on the request being associated with an industry identifier that indicates that the organization operates within the particular industry. Additionally, the transformation platform may modify one or more aspects of the templated configuration based on performing the machine-learning-driven analysis of the set of observations and the set of priorities. Additionally, the transformation platform may generate, as the recommendation for the configuration, a particular recommendation for the templated configuration that has been modified.

In some implementations, when generating the service management plan, the transformation platform may generate a timeline that indicates when to implement one or more aspects of the fully-integrated ERP system. In some implementations, the service management plan may be generated based on an analysis of: the recommendation, and budget data associated with the organization.

In some implementations, the service management plan may include a third set of instructions that describe how to use the set of service management tools. In some implementations, the transformation platform may perform, after performing the first set of actions, a third set of actions that use the third set of instructions to onboard one or more users associated with the organization.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
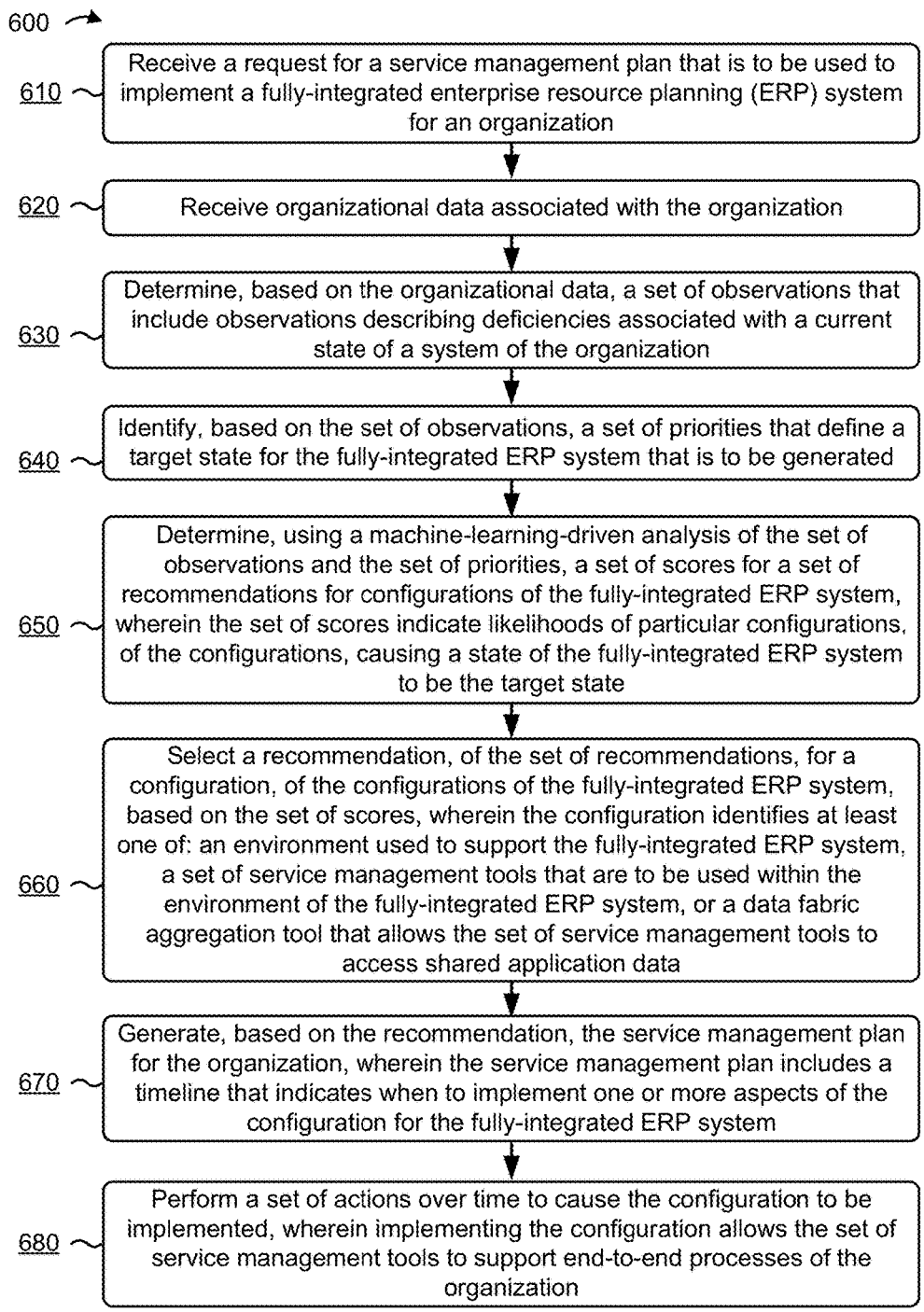

FIG. 6 is a flow chart of an example process 600 for generating and implementing a service management plan. In some implementations, one or more process blocks of FIG. 6 may be performed by a transformation platform (e.g., transformation platform 230). In some implementations, one or more process blocks of FIG. 6 may be performed by another device or a group of devices separate from or including the transformation platform, such as a client device (e.g., client device 210), a data storage device (e.g., data storage device 220), and/or a client system (e.g., client system 250).

As shown in FIG. 6, process 600 may include receiving a request for a service management plan that is to be used to implement a fully-integrated enterprise resource planning (ERP) system for an organization (block 610). For example, the transformation platform (e.g., using computing resource 235, processor 320, memory 330, storage component 340, input component 350, communication interface 370, and/or the like) may receive a request for a service management plan that is to be used to implement a fully-integrated enterprise resource planning (ERP) system for an organization, as described above.

As further shown in FIG. 6, process 600 may include receiving organizational data associated with the organization (block 620). For example, the transformation platform (e.g., using computing resource 235, processor 320, memory 330, storage component 340, input component 350, communication interface 370, and/or the like) may receive organizational data associated with the organization, as described above.

As further shown in FIG. 6, process 600 may include determining, based on the organizational data, a set of observations that include observations describing deficiencies associated with a current state of a system of the organization (block 630). For example, the transformation platform (e.g., using computing resource 235, processor 320, memory 330, storage component 340, and/or the like) may determine, based on the organizational data, a set of observations that include observations describing deficiencies associated with a current state of a system of the organization (e.g., client system 250), as described above.

As further shown in FIG. 6, process 600 may include identifying, based on the set of observations, a set of priorities that define a target state for the fully-integrated ERP system that is to be generated (block 640). For example, the transformation platform (e.g., using computing resource 235, processor 320, memory 330, storage component 340, and/or the like) may identify, based on the set of observations, a set of priorities that define a target state for the fully-integrated ERP system that is to be generated, as described above.

As further shown in FIG. 6, process 600 may include determining, using a machine-learning-driven analysis of the set of observations and the set of priorities, a set of scores for a set of recommendations for configurations of the fully-integrated ERP system, wherein the set of scores indicate likelihoods of particular configurations, of the configurations, causing a state of the fully-integrated ERP system to be the target state (block 650). For example, the transformation platform (e.g., using computing resource 235, processor 320, memory 330, storage component 340, and/or the like) may determine, using a machine-learning-driven analysis of the set of observations and the set of priorities, a set of scores for a set of recommendations for configurations of the fully-integrated ERP system, as described above. In some implementations, the set of scores may indicate likelihoods of particular configurations, of the configurations, causing a state of the fully-integrated ERP system to be the target state.

As further shown in FIG. 6, process 600 may include selecting a recommendation, of the set of recommendations, for a configuration, of the configurations of the fully-integrated ERP system, based on the set of scores, wherein the configuration identifies at least one of: an environment used to support the fully-integrated ERP system, a set of service management tools that are to be used within the environment of the fully-integrated ERP system, or a data fabric aggregation tool that allows the set of service management tools to access shared application data (block 660). For example, the transformation platform (e.g., using computing resource 235, processor 320, memory 330, storage component 340, and/or the like) may select a recommendation, of the set of recommendations, for a configuration, of the configurations of the fully-integrated ERP system, based on the set of scores, as described above. In some implementations, the configuration may identify at least one of: an environment used to support the fully-integrated ERP system, a set of service management tools that are to be used within the environment of the fully-integrated ERP system, or a data fabric aggregation tool that allows the set of service management tools to access shared application data.

As further shown in FIG. 6, process 600 may include generating, based on the recommendation, the service management plan for the organization, wherein the service management plan includes a timeline that indicates when to implement one or more aspects of the configuration for the fully-integrated ERP system (block 670). For example, the transformation platform (e.g., using computing resource 235, processor 320, memory 330, storage component 340, and/or the like) may generate, based on the recommendation, the service management plan for the organization, as described above. In some implementations, the service management plan may include a timeline that indicates when to implement one or more aspects of the configuration for the fully-integrated ERP system.

As further shown in FIG. 6, process 600 may include performing a set of actions over time to cause the configuration to be implemented, wherein implementing the configuration allows the set of service management tools to support end-to-end processes of the organization (block 680). For example, the transformation platform (e.g., using computing resource 235, processor 320, memory 330, storage component 340, input component 350, output component 360, communication interface 370, and/or the like) may perform a set of actions over time to cause the configuration to be implemented, as described above. In some implementations, implementing the configuration may allow the set of service management tools to support end-to-end processes of the organization.

Process 600 may include additional implementations, such as any single implementation or any combination of implementations described below and/or in connection with one or more other processes described elsewhere herein.

In some implementations, the organizational data may include data that describes the end-to-end processes of the organization, and a set of performance indicators associated with the end-to-end processes of the organization.

In some implementations, the transformation platform may determine the set of observations by performing one or more diagnostic assessments of the organizational data. In some implementations, the organizational data may include a set of performance indicators. In some implementations, at least one diagnostic assessment is based on comparing the set of performance indicators and a set of industry performance benchmarks.

In some implementations, when identifying the set of priorities, the transformation platform may receive, from another device that is associated with the organization, a first subset of priorities of the set of priorities. Additionally, the transformation platform may compare the set of deficiencies of the system and a set of properties of one or more systems associated with other organizations. Additionally, the transformation platform may identify one or more priorities, of the set of priorities, based on comparing the set of deficiencies and the set of properties.

In some implementations, the transformation platform may generate a set of terms for a contract that describes the service management plan as an offer for the organization. In some implementations, the transformation platform may provide, to another device that is associated with the organization, the service management plan and the contract to permit the other device to display the service management plan and the contract via an interface. In some implementations, the transformation platform may receive, from the other device, an indication that the contract is accepted by the organization. In some implementations, the transformation platform may perform the set of actions based on receiving the indication that the contract is accepted by the organization.

In some implementations, the set of actions may be a first set of actions. In some implementations, when generating the service management plan, the transformation platform may generate, as part of the timeline, information that describes a manner in which to measure performance of the fully-integrated ERP system relative to the system of the organization. In some implementations, the transformation platform may perform a second set of actions to cause performance statistics to be displayed via an interface. In some implementations, the performance statistics may measure the performance of the fully-integrated ERP system relative to the system of the organization.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a request for a service management plan that is to be used to implement a fully-integrated enterprise resource planning (ERP) system for an organization;
   receiving, by the device, organizational data associated with the organization,
      the organizational data including one or more of:
         process data that describes a set of organizational processes that are used for providing goods and/or services to customers,
         application data that is generated while the set of organizational processes are being performed, or
         performance indicator data that identifies a set of network performance metrics for measuring performance within the organization;
   determining, by the device and by performing one or more diagnostic assessments of the organizational data, a set of observations that include observations describing deficiencies associated with a current state of a system of the organization;
   identifying, by the device and based on the set of observations, a set of priorities that define a target state for the fully-integrated ERP system that is to be generated;
   selecting, by the device based on a machine-learning-driven analysis of the set of observations and the set of priorities, a recommendation for a configuration of the fully-integrated ERP system,
      wherein the configuration identifies:
         a set of service management tools that are to be used within an environment of the fully-integrated ERP system, and
         a data fabric aggregation tool that allows the set of service management tools to access shared application data,
            the shared application data being associated with other fully-integrated ERP systems;
   generating, by the device and based on the recommendation, the service management plan for the organization, wherein the service management plan describes a manner in which to implement the configuration of the fully-integrated ERP system; and performing, by the device, a set of actions to cause the configuration to be implemented, wherein implementing the configuration allows the set of service management tools to support end-to-end processes of the organization.

2. The method of claim 1, wherein performing the set of actions comprises:

configuring, as part of the fully-integrated ERP system, the data fabric aggregation tool with a feature that converts the shared application data to a uniform format.

3. The method of claim 1, wherein the set of observations include at least one of:

a first set of observations that indicate an amount of customization used within tools that are part of the system of the organization, a second set of observations that indicate an amount of automation used by tools that are part of the system of the organization, or a third set of observations that indicate a set of deficiencies of the system of the organization.

4. The method of claim 1, wherein identifying the set of priorities that define the target state comprises:

comparing a set of deficiencies of the system and a set of properties of one or more systems associated with other organizations, and identifying one or more priorities, of the set of priorities, based on comparing the set of deficiencies and the set of properties.

5. The method of claim 1, wherein selecting the recommendation comprises:

providing, as input to a data model that has been trained using one or more machine learning techniques, observation data that identifies the set of observations and priorities data that identifies the set of priorities, to cause the data model to output a set of scores that indicate likelihoods of recommendations for particular configurations causing a state of the fully-integrated ERP system to be the target state, and selecting the recommendation for the configuration, of the recommendations for the particular configurations, based on the recommendation for the configuration being associated with a score that indicates a highest likelihood of causing the state of the fully-integrated ERP system to be the target state.

6. The method of claim 1, further comprising:

generating, before receiving the request, a templated configuration for fully-integrated ERP systems used within a particular industry; and wherein selecting the recommendation comprises:

identifying the templated configuration based on the request including an industry identifier that indicates that the organization operates within the particular industry, modifying one or more aspects of the templated configuration based on performing the machine-learning-driven analysis of the set of observations and the set of priorities, and generating, as the recommendation for the configuration, a particular recommendation for the templated configuration that has been modified.

7. The method of claim 1, further comprising:

monitoring, after performing the set of actions to cause the configuration to be implemented, application data that is generated by the set of service management tools;

generating a set of network performance indicators based on the application data;

comparing the set of network performance indicators to a corresponding set of network performance indicators that are part of the organizational data;

generating performance statistics based on comparing the set of network performance indicators and the corresponding set of network performance indicators; and providing the performance statistics for display via an interface.

8. A device, comprising:

one or more memories; and one or more processors, operatively coupled to the one or more memories, to:

receive a request for a service management plan that is to be used to implement a fully-integrated enterprise resource planning (ERP) system for an organization;

receive organizational data associated with the organization, wherein the organizational data includes one or more of:

process data that describes a set of organizational processes that are used for providing goods and/or services to customers, application data that is generated while the set of organizational processes are being performed, or performance indicator data that identifies a set of network performance metrics for measuring performance within the organization;

determine, based on the organizational data, a set of observations that include observations describing deficiencies associated with a current state of a system of the organization;

identify, based on the set of observations, a set of priorities that define a target state for the fully-integrated ERP system that is to be generated;

generate, based on a machine-learning-driven analysis of the set of observations and the set of priorities, a recommendation for a configuration of the fully-integrated ERP system, wherein the configuration identifies at least one of:

a set of service management tools that are to be used within an environment of the fully-integrated ERP system, or a data fabric aggregation tool that allows the set of service management tools to access shared application data, wherein the shared application data is associated with other fully-integrated ERP systems;

generate, based on the recommendation, the service management plan for the organization, wherein the service management plan includes:

a first set of instructions that describe a manner in which to implement the configuration of the fully-integrated ERP system, and a second set of instructions that describe a manner in which to measure performance of the fully-integrated ERP system relative to the system of the organization;

perform a first set of actions to cause the configuration to be implemented, wherein implementing the configuration allows the set of service management tools to support end-to-end processes of the organization; and
perform a second set of actions to cause performance statistics to be displayed via an interface,
wherein the performance statistics measure the performance of the fully-integrated ERP system relative to the system of the organization.

9. The device of claim 8, wherein the one or more processors, when performing the first set of actions, are to:
configure, as part of the fully-integrated ERP system, the data fabric aggregation tool with a feature that converts the shared application data to a uniform format, and
update a master data fabric aggregation tool to store a copy of the shared application data,
wherein the master data fabric aggregation tool also stores copies of other shared application data of other organizations.

10. The device of claim 8, wherein the one or more processors, when determining the set of observations, are to:
determine the set of observations by performing one or more diagnostic assessments of the organizational data,
wherein the performance indicator data includes a set of performance indicators, and
wherein at least one diagnostic assessment is based on comparing the set of performance indicators and a set of industry performance benchmarks.

11. The device of claim 8, wherein the one or more processors, when generating the recommendation, are to:
provide, as input to a data model that has been trained using one or more machine learning techniques, observation data that identifies the set of observations and priorities data that identifies the set of priorities, to cause the data model to output a set of scores that indicate likelihoods of recommendations for particular configurations causing a state of the fully-integrated ERP system to be the target state, and
select the recommendation for the configuration, of the recommendations for the particular configurations, based on the recommendation for the configuration being associated with a score that indicates a highest likelihood of causing the state of the fully-integrated ERP system to be the target state.

12. The device of claim 8, wherein the one or more processors are further to:
generate, before receiving the request, a templated configuration for fully-integrated ERP systems used within a particular industry,
wherein the templated configuration is generated by using a data model that has been trained by using one or more machine learning techniques to analyze historical organizational data of organizations within the particular industry; and
wherein the one or more processors, when generating the recommendation, are to:
identify the templated configuration based on the request being associated with an industry identifier that indicates that the organization operates within the particular industry,
modify one or more aspects of the templated configuration based on performing the machine-learning-driven analysis of the set of observations and the set of priorities, and
generate, as the recommendation for the configuration, a particular recommendation for the templated configuration that has been modified.

13. The device of claim 8, wherein the one or more processors, when generating the service management plan, are to:
generate, as part of the service management plan, a timeline that indicates when to implement one or more aspects of the fully-integrated ERP system,
wherein the service management plan is generated based on an analysis of:
the recommendation, and
budget data associated with the organization.

14. The device of claim 8, wherein the service management plan includes a third set of instructions that describe how to use the set of service management tools; and
wherein the one or more processors are further to:
perform, after performing the first set of actions, a third set of actions that use the third set of instructions to onboard one or more users associated with the organization.

15. A non-transitory computer-readable medium storing instructions, the instructions comprising:
one or more instructions that, when executed by one or more processors of a device, cause the one or more processors to:
receive a request for a service management plan that is to be used to implement a fully-integrated enterprise resource planning (ERP) system for an organization;
receive organizational data associated with the organization,
wherein the organizational data includes one or more of:
process data that describes a set of organizational processes that are used for providing goods and/or services to customers,
application data that is generated while the set of organizational processes are being performed, or
performance indicator data that identifies a set of network performance metrics for measuring performance within the organization;
determine, based on the organizational data, a set of observations that include observations describing deficiencies associated with a current state of a system of the organization;
identify, based on the set of observations, a set of priorities that define a target state for the fully-integrated ERP system that is to be generated;
determine, using a machine-learning-driven analysis of the set of observations and the set of priorities, a set of scores for a set of recommendations for configurations of the fully-integrated ERP system,
wherein the set of scores indicate likelihoods of particular configurations, of the configurations, causing a state of the fully-integrated ERP system to be the target state;
select a recommendation, of the set of recommendations, for a configuration, of the configurations of the fully-integrated ERP system, based on the set of scores,
wherein the configuration identifies at least one of:
an environment used to support the fully-integrated ERP system,
a set of service management tools that are to be used within the environment of the fully-integrated ERP system, or
a data fabric aggregation tool that allows the set of service management tools to access shared application data, wherein the shared application data is associated with other fully-integrated ERP systems;

generate, based on the recommendation, the service management plan for the organization,
 wherein the service management plan includes a timeline that indicates when to implement one or more aspects of the configuration for the fully-integrated ERP system; and perform a set of actions over time to cause the configuration to be implemented,
 wherein implementing the configuration allows the set of service management tools to support end-to-end processes of the organization.

16. The non-transitory computer-readable medium of claim 15, wherein the organizational data includes:
 data that describes the end-to-end processes of the organization, and
 wherein the performance indicator data includes a set of performance indicators associated with the end-to-end processes of the organization.

17. The non-transitory computer-readable medium of claim 15, wherein the one or more instructions, that cause the one or more processors to determine the set of observations, cause the one or more processors to:
 determine the set of observations by performing one or more diagnostic assessments of the organizational data,
 wherein the performance indicator data includes a set of performance indicators, and
 wherein at least one diagnostic assessment is based on comparing the set of performance indicators and a set of industry performance benchmarks.

18. The non-transitory computer-readable medium of claim 15, wherein the one or more instructions, that cause the one or more processors to identify the set of priorities that define the target state, cause the one or more processors to:
 receive, from another device that is associated with the organization, a first subset of priorities of the set of priorities,
 compare a set of deficiencies of the system and a set of properties of one or more systems associated with other organizations, and
 identify one or more priorities, of the set of priorities, based on comparing the set of deficiencies and the set of properties.

19. The non-transitory computer-readable medium of claim 15, wherein the one or more instructions, when executed by the one or more processors, further cause the one or more processors to:
 generate a set of terms for a contract that describes the service management plan as an offer for the organization;
 provide, to another device that is associated with the organization, the service management plan and the contract to permit the other device to display the service management plan and the contract via an interface;
 receive, from the other device, an indication that the contract is accepted by the organization; and
 wherein the one or more instructions, that cause the one or more processors to perform the set of actions, cause the one or more processors to:
  perform the set of actions based on receiving the indication that the contract is accepted by the organization.

20. The non-transitory computer-readable medium of claim 15, wherein the set of actions are a first set of actions;
 wherein the one or more instructions, that cause the one or more processors to generate the service management plan, cause the one or more processors to:
  generate, as part of the timeline, information that describes a manner in which to measure performance of the fully-integrated ERP system relative to the system of the organization; and
 wherein the one or more instructions, when executed by the one or more processors, further cause the one or more processors to:
  perform a second set of actions to cause performance statistics to be displayed via an interface,
   wherein the performance statistics measure the performance of the fully-integrated ERP system relative to the system of the organization.

* * * * *